(12) United States Patent
Broyde et al.

(10) Patent No.: US 9,628,135 B1
(45) Date of Patent: Apr. 18, 2017

(54) METHOD FOR AUTOMATICALLY ADJUSTING A TUNABLE MATCHING CIRCUIT, AND AUTOMATIC TUNING SYSTEM USING THIS METHOD

(71) Applicant: TEKCEM, Maule (FR)

(72) Inventors: Frédéric Broyde, Maule (FR); Evelyne Clavelier, Maule (FR)

(73) Assignee: TEKCEM, Maule (FR)

( * ) Notice: Subject to any disclaimer, the term of this patent is extended or adjusted under 35 U.S.C. 154(b) by 0 days.

(21) Appl. No.: 15/360,519

(22) Filed: Nov. 23, 2016

Related U.S. Application Data

(63) Continuation of application No. PCT/IB2016/056839, filed on Nov. 14, 2016.

(51) Int. Cl.
*H04B 1/40* (2015.01)

(52) U.S. Cl.
CPC ..................... *H04B 1/40* (2013.01)

(58) Field of Classification Search
CPC .......... H04B 1/40; H03H 11/28; H03H 11/30; H03H 11/34; H03H 7/40
See application file for complete search history.

(56) References Cited

U.S. PATENT DOCUMENTS

| 2,523,791 A | 9/1950 | Vahle et al. |
| 2,745,067 A * | 5/1956 | True .......................... H03H 7/40 318/606 |
| 3,443,231 A | 5/1969 | Roza |
| 4,356,458 A * | 10/1982 | Armitage ................. H03H 7/40 327/108 |
| 4,493,112 A | 1/1985 | Bruene |

(Continued)

FOREIGN PATENT DOCUMENTS

FR    WO 2010/141774 A2    12/2010

OTHER PUBLICATIONS

Broyde et al., "Some Properties of Multiple-Antenna-Port and Multiple-User-Port Antenna Tuners", IEEE Trans. on Circuits and Systems—I: Regular Papers, vol. 62, No. 2, pp. 423-432, Feb. 2015.

(Continued)

*Primary Examiner* — Lewis West
(74) *Attorney, Agent, or Firm* — Barnes & Thornburg LLP

(57) ABSTRACT

The invention relates to a method for automatically adjusting a single-input-port and single-output-port tunable matching circuit, for instance a single-input-port and single-output-port tunable matching circuit coupled to an antenna of a radio transceiver. The invention also relates to an automatic tuning system using this method. An automatic tuning system comprises: one user port; one target port; a sensing unit; a single-input-port and single-output-port tunable matching circuit comprising one or more adjustable impedance devices; a signal processing unit which delivers a tuning instruction as a function of one or more temperature signals and as a function of two or more real quantities depending on an impedance seen by the target port; and a tuning control unit which delivers tuning control signals, the reactance of each adjustable impedance device of the tunable matching circuit being determined by at least one of the tuning control signals.

19 Claims, 5 Drawing Sheets

(56) References Cited

U.S. PATENT DOCUMENTS

| | | | |
|---|---|---|---|
| 4,973,940 A * | 11/1990 | Sakai | H04B 3/56 333/101 |
| 5,225,847 A | 7/1993 | Roberts et al. | |
| 5,564,086 A | 10/1996 | Cygan et al. | |
| 6,414,562 B1 | 7/2002 | Bouisse et al. | |
| 6,590,468 B2 * | 7/2003 | du Toit | H01P 5/028 333/17.3 |
| 7,865,154 B2 * | 1/2011 | Mendolia | H01P 5/04 455/125 |
| 8,072,285 B2 * | 12/2011 | Spears | H03H 7/40 333/17.3 |
| 8,294,632 B2 * | 10/2012 | Skarp | H04B 1/0458 333/17.3 |
| 8,299,867 B2 * | 10/2012 | McKinzie, III | H03H 7/40 333/17.3 |
| 8,693,963 B2 * | 4/2014 | du Toit | H01P 5/04 333/17.3 |
| 9,077,317 B2 * | 7/2015 | Broyde | H04B 1/0458 |
| 2004/0263411 A1 * | 12/2004 | Fabrega-Sanchez | G01R 27/2694 343/861 |
| 2005/0007291 A1 * | 1/2005 | Fabrega-Sanchez | G01R 27/2694 343/860 |
| 2007/0197180 A1 * | 8/2007 | McKinzie, III | H03H 7/40 455/248.1 |
| 2008/0106349 A1 * | 5/2008 | McKinzie | H03H 7/38 333/17.3 |
| 2011/0116423 A1 * | 5/2011 | Rousu | H01Q 1/242 370/297 |
| 2012/0075016 A1 | 3/2012 | Visser et al. | |
| 2013/0069737 A1 | 3/2013 | See et al. | |
| 2014/0273887 A1 * | 9/2014 | Black | H03H 7/40 455/77 |
| 2015/0078485 A1 * | 3/2015 | Broyde | H04B 1/0458 375/297 |
| 2016/0105210 A1 * | 4/2016 | Zhu | H03H 7/38 455/77 |

OTHER PUBLICATIONS

J. Nath et al., "Discrete Barium Strontium Titanate (BST) Thin-Film Interdigital Varactors on Alumina: Design, Fabrication, Characterization, and Applications", 2006 IEEE MTT-S International Microwave Symposium Digest, pp. 552-555, Jun. 2006.

* cited by examiner

METHOD FOR AUTOMATICALLY ADJUSTING A TUNABLE MATCHING CIRCUIT, AND AUTOMATIC TUNING SYSTEM USING THIS METHOD

CROSS REFERENCE TO RELATED APPLICATIONS

This is a Continuation Application of PCT application No. PCT/IB2016/056839, filed 14 Nov. 2016, entitled "Method for automatically adjusting a tunable matching circuit, and automatic tuning system using this method", which in turn claims priority to French patent application No. 16/00273 of 16 Feb. 2016, entitled "Procédé pour régler automatiquement un circuit d'adaptation accordable, et système d'accord automatique utilisant ce procédé", both of which are incorporated herein by reference.

FIELD OF THE INVENTION

The invention relates to a method for automatically adjusting a single-input-port and single-output-port tunable matching circuit, for instance a single-input-port and single-output-port tunable matching circuit coupled to an antenna of a radio transceiver. The invention also relates to an automatic tuning system using this method.

PRIOR ART

Tuning an impedance means obtaining that an impedance presented by an input port of a device approximates a wanted impedance, and simultaneously offering an ideally lossless, or nearly lossless, transfer of power from the input port to an output port of the device, in a context where the impedance seen by the output port may vary. Thus, if a signal generator presenting an impedance equal to the complex conjugate of the wanted impedance is connected to the input port, it will deliver a maximum power to the input port, this maximum power being referred to as "available power", and the output port will deliver a power near this maximum power.

A single-input-port and single-output-port tunable matching circuit behaves, at any frequency in a given frequency band, with respect to its input port and output port, substantially as a passive linear 2-port device. Here, "passive" is used in the meaning of circuit theory, so that the single-input-port and single-output-port tunable matching circuit does not provide amplification. A single-input-port and single-output-port tunable matching circuit comprises one or more adjustable impedance devices each having an adjustable reactance. Adjusting a single-input-port and single-output-port tunable matching circuit means adjusting the reactance of one or more of its adjustable impedance devices. A single-input-port and single-output-port tunable matching circuit may be used for tuning an impedance. To tune an impedance, the single-input-port and single-output-port tunable matching circuit must be properly adjusted.

In what follows, an automatic tuning system is an apparatus which can automatically adjust a single-input-port and single-output-port tunable matching circuit. When it is intended to be inserted between an antenna and a wireless transmitter, the automatic tuning system is sometimes referred to as "automatic antenna tuner" or as "adaptive impedance matching module". An automatic tuning system is indeed adaptive, in the sense that some circuit parameters, namely the reactances of adjustable impedance devices, are varied with time as a function of circuit variables such as sensed voltages or currents.

Many automatic tuning systems have been described, which use one or more real quantities depending on the impedance presented by the input port, these real quantities being processed to obtain "tuning control signals", the tuning control signals being used to control the reactances of the adjustable impedance devices of a single-input-port and single-output-port tunable matching circuit.

The block diagram of a prior art automatic tuning system having a user port and a target port is shown in FIG. 1. The automatic tuning system shown in FIG. 1 allows, at a given frequency, a transfer of power from the user port (5) to the target port (6), the automatic tuning system comprising:

- a sensing unit (1) delivering one or more "sensing unit output signals", each of the sensing unit output signals being mainly determined by one or more electrical variables sensed at the user port;
- a signal processing unit (2) estimating one or more real quantities depending on an impedance presented by the user port, using the sensing unit output signals obtained while an excitation is applied to the user port, the signal processing unit producing an output signal;
- a single-input-port and single-output-port tunable matching circuit (4) comprising one or more adjustable impedance devices, the one or more adjustable impedance devices being such that, at said given frequency, each of the one or more adjustable impedance devices has a reactance, the reactance of any one of the one or more adjustable impedance devices having an influence on the impedance presented by the user port, the reactance of any one of the one or more adjustable impedance devices being adjustable by electrical means; and
- a tuning control unit (3), the tuning control unit receiving the output signal of the signal processing unit, the tuning control unit delivering one or more "tuning control signals" to the single-input-port and single-output-port tunable matching circuit, the reactance of each of the one or more adjustable impedance devices being mainly determined by at least one of the one or more tuning control signals.

In FIG. 1, the output port of the single-input-port and single-output-port tunable matching circuit is directly coupled to the target port (6), and the input port of the single-input-port and single-output-port tunable matching circuit is indirectly coupled to the user port (5), through the sensing unit (1). The sensing unit is such that each of said one or more real quantities depending on an impedance presented by the user port is also a real quantity depending on the impedance presented by the input port (of the single-input-port and single-output-port tunable matching circuit). In fact, the sensing unit is typically such that the impedance presented by the user port approximates the impedance presented by this input port.

For instance, in an automatic tuning system disclosed in the U.S. Pat. No. 2,523,791, entitled "Automatic Tuning System", in an automatic tuning system disclosed in the patent of the U.S. Pat. No. 2,745,067, entitled "Automatic Impedance Matching Apparatus", and in an automatic tuning system disclosed in the patent of the U.S. Pat. No. 3,443,231, entitled "Impedance Matching System", the wanted impedance is a resistance. We shall use $R_0$ to denote this resistance. In each of these apparatuses, a voltage v and a current i are sensed at a given point in a circuit, the impedance presented by the user port being $Z=v/i$. In each of these apparatuses, the real quantities depending on the impedance presented by the user port are a voltage determined by the phase of v relative to i, this phase being equal to the argument of Z, and a voltage substantially proportional to the difference $|v|-R_0|i|$. In each of these apparatuses, the second real quantity depending on the impedance presented by the user port is substantially equal to zero if the impedance presented by the user port is substantially equal to the wanted impedance, but the converse is not true. In the case of said U.S. Pat. No. 2,745,067 and U.S. Pat. No. 3,443,231, the two real quantities depending on the impedance presented by the user port are substantially equal to zero if and only if the impedance presented by the user port is substantially equal to the wanted impedance.

The automatic tuning systems disclosed in said U.S. Pat. No. 2,523,791 and U.S. Pat. No. 2,745,067 each corresponds to the block diagram shown in FIG. 1. In the case of said U.S. Pat. No. 3,443,231, two other real quantities representative of an impedance other than the impedance presented by the user port are also used to obtain the tuning control signals. Thus, the block diagram shown in FIG. 1 is not applicable to the automatic tuning system disclosed in said U.S. Pat. No. 3,443,231. However, a specialists sees that it is possible to consider that the automatic tuning system disclosed in said U.S. Pat. No. 3,443,231 is in fact composed of two automatic tuning systems each corresponding to the block diagram shown in FIG. 1.

For instance, in an automatic tuning system disclosed in the U.S. Pat. No. 4,356,458, entitled "Automatic Impedance Matching Apparatus" and in an automatic tuning system disclosed in the patent of the U.S. Pat. No. 5,225,847 entitled "Automatic Antenna Tuning System", two voltages are sensed: a voltage substantially proportional to the absolute value of a complex incident voltage at the user port (an incident voltage is also referred to as forward voltage), and a voltage substantially proportional to the absolute value of a complex reflected voltage at the user port. Using the same notations as above, $v_F$ to denote the complex incident voltage at the user port, and $v_R$ to denote the complex reflected voltage at the user port, the specialist understands that said absolute values are given by $|v_F|=|v+R_0 i|/2$ and $|v_R|=|v-R_0 i|/2$, respectively. In each of these apparatuses, a single real quantity depending on the impedance presented by the user port is used. It is a number processed in a digital circuit. In one of these apparatuses, this number is substantially equal to the ratio of the absolute value of the complex reflected voltage to the absolute value of the complex incident voltage, that is to say, to $|v_R|/|v_F|$. In the other of these apparatuses, this number is substantially equal to the squared inverse of this ratio, that is to say, to $|v_F|^2/|v_R|^2$.

For instance, in an automatic tuning system disclosed in the U.S. Pat. No. 4,493,112, entitled "Antenna Tuner Discriminator", two complex voltages are sensed: a voltage substantially proportional to an incident voltage at the user port, and a voltage substantially proportional to a reflected voltage at the user port. Using the incident voltage as reference for the phase, a voltage proportional to the real part of the reflected voltage and a voltage proportional to the imaginary part of the reflected voltage are obtained. In this apparatus, the real quantities depending on the impedance presented by the user port are the voltage proportional to the real part of the reflected voltage and the voltage proportional to the imaginary part of the reflected voltage. In this apparatus, the two real quantities depending on the impedance presented by the user port are substantially equal to zero if and only if the impedance presented by the user port is substantially equal to the wanted impedance.

In the apparatuses disclosed in said U.S. Pat. No. 4,356,458 and U.S. Pat. No. 5,225,847, a digital feedback loop involving sequential logic must be used to obtain the tuning control signals and tune the impedance presented by the user port, because the single real quantity depending on the impedance presented by the user port does not provide a full information on the impedance presented by the user port. In the other apparatuses considered above, a faster tuning can be obtained, because two real quantities depending on the impedance presented by the user port provide a full information on the impedance presented by the user port, so that a simple degenerative feedback loop can be used to obtain the tuning control signals and tune the impedance presented by the user port.

The automatic tuning systems disclosed in said U.S. Pat. No. 4,356,458, U.S. Pat. No. 4,493,112 and U.S. Pat. No. 5,225,847 each corresponds to the block diagram shown in FIG. 1.

The automatic tuning system shown in FIG. 1 uses a closed-loop control scheme, in which the real quantities depending on the impedance presented by the user port are used to obtain tuning control signals, which determine the reactance of each of the adjustable impedance devices, and which therefore determine the impedance presented by the user port. The specialist understands that an automatic tuning system using real quantities depending on the impedance presented by the user port which provides a full information on the impedance presented by the user port, can achieve the fastest tuning if, based on this full information obtained at a given time for known tuning control signals and on a model of the single-input-port and single-output-port tunable matching circuit, it computes the values of the tuning control signals needed to obtain an exact tuning and quickly delivers the corresponding tuning control signals. In this case, the computation is very difficult, because there is no direct relationship between the real quantities depending on the impedance presented by the user port and the reactance value that each of the adjustable impedance devices should take on after having been adjusted. Thus, the automatic tuning system shown in FIG. 1 is slow or it requires very difficult computations. Moreover, it can be shown that an adjustment of a single-input-port and single-output-port tunable matching circuit obtained using the automatic tuning system shown in FIG. 1 need not be optimal when the losses in the single-input-port and single-output-port tunable matching circuit are not very small.

The block diagram of another prior art automatic tuning system having a user port and a target port is shown in FIG. 2. The automatic tuning system shown in FIG. 2 allows, at a given frequency, a transfer of power from the user port (5) to the target port (6), the automatic tuning system comprising:

a sensing unit (1) delivering one or more "sensing unit output signals", each of the sensing unit output signals being mainly determined by one or more electrical variables sensed at the target port;

a signal processing unit (2) estimating one or more real quantities depending on an impedance seen by the target port, using the sensing unit output signals obtained while an excitation is applied to the user port, the signal processing unit producing an output signal;

a single-input-port and single-output-port tunable matching circuit (4) comprising one or more adjustable impedance devices, the one or more adjustable impedance devices being such that, at said given frequency, each of the one or more adjustable impedance devices has a reactance, the reactance of any one of the one or more adjustable impedance devices having an influence on the impedance presented by the user port, the reactance of any one of the one or more adjustable impedance devices being adjustable by electrical means; and a tuning control unit (3), the tuning control unit receiving the output signal of the signal processing unit, the tuning control unit delivering one or more "tuning control signals" to the single-input-port and single-output-port tunable matching circuit, the reactance of each of the one or more adjustable impedance devices being mainly determined by at least one of the one or more tuning control signals.

In FIG. 2, the output port of the single-input-port and single-output-port tunable matching circuit is indirectly coupled to the target port (6), through the sensing unit (1), and the input port of the single-input-port and single-output-port tunable matching circuit is directly coupled to the user port (5). The sensing unit is such that each of said one or more real quantities depending on an impedance seen by the target port is also a real quantity depending on the impedance seen by the output port (of the single-input-port and single-output-port tunable matching circuit). In fact, the sensing unit is typically such that the impedance seen by the target port approximates the impedance seen by this output port.

For instance, in an automatic tuning system disclosed in the U.S. Pat. No. 5,564,086, entitled "Method and apparatus for enhancing an operating characteristic of a radio transmitter" and in an automatic tuning system disclosed in the patent of the U.S. Pat. No. 6,414,562, entitled "Circuit and method for impedance matching", two voltages are sensed: a voltage substantially proportional to the complex incident voltage at the target port, denoted by $u_F$, and a voltage substantially proportional to the complex reflected voltage at the target port, denoted by $u_R$. In said U.S. Pat. No. 5,564,086, the real quantities depending on an impedance seen by the target port are the absolute value and the phase of the ratio of the complex reflected voltage to the complex incident voltage, that is to say, of the ratio $u_R/u_F$. In said U.S. Pat. No. 6,414,562, the real quantities depending on an impedance seen by the target port are the difference of the absolute values of $u_F$ and $u_R$, that is to say, $|u_F|-|u_R|$, and a real function of the phase difference between $u_F$ and $u_R$, this function being produced by a phase comparator.

The automatic tuning systems disclosed in said U.S. Pat. No. 5,564,086 and No. 6,414,562 each corresponds to the block diagram shown in FIG. 2.

The automatic tuning system shown in FIG. 2 uses an open-loop control scheme, in which the real quantities depending on an impedance seen by the target port are used to obtain tuning control signals, the tuning control signals having no influence on the impedance seen by the target port. The specialist understands that such an open-loop control scheme automatic tuning system is explicitly or implicitly based on a model of the single-input-port and single-output-port tunable matching circuit. Using the knowledge of the frequency of operation and of the real quantities depending on the impedance seen by the target port, the automatic tuning system determines the values of the tuning control signals. This does not require a difficult computation. For instance, only simple interpolations are needed if a lookup table (also spelled "look-up table") is used to obtain tuning control signals, based on the frequency of operation and on the real quantities depending on an impedance seen by the target port. Unfortunately, the automatic tuning system shown in FIG. 2 often only provides an inaccurate tuning, so that the impedance presented by the user port is not optimal.

Consequently, there is no known solution to the problem of optimally, quickly and automatically adjusting a single-input-port and single-output-port tunable matching circuit, without very difficult computations, or when the losses in the single-input-port and single-output-port tunable matching circuit are not very small.

SUMMARY OF THE INVENTION

The purpose of the invention is a method for automatically adjusting a single-input-port and single-output-port tunable matching circuit, without the above-mentioned limitations of known techniques, and also an automatic tuning system using this method.

In what follows, "having an influence" and "having an effect" have the same meaning. In what follows, "coupled", when applied to two ports, may indicate that the ports are directly coupled, in which case each terminal of one of the ports is connected to (or equivalently in electrical contact with) one and only one terminal of the other port, and/or that the ports are indirectly coupled, in which case an electrical interaction different from direct coupling takes place between the ports, for instance through one or more elements.

The method of the invention is a method for automatically adjusting a single-input-port and single-output-port tunable matching circuit, the single-input-port and single-output-port tunable matching circuit being a part of an automatic tuning system having a "user port" and a "target port", the automatic tuning system allowing, at a given frequency, a transfer of power from the user port to the target port, the single-input-port and single-output-port tunable matching circuit comprising one or more adjustable impedance devices, the one or more adjustable impedance devices being referred to as "the adjustable impedance devices of the tunable matching circuit" and being such that, at said given frequency, each of the adjustable impedance devices of the tunable matching circuit has a reactance, the reactance of any one of the adjustable impedance devices of the tunable matching circuit being adjustable by electrical means, the method comprising the steps of:

applying an excitation to the user port;

sensing electrical variables at the target port, to obtain two or more "sensing unit output signals", each of the sensing unit output signals being mainly determined by one or more of the electrical variables sensed at the target port;

measuring, at one or more locations in the single-input-port and single-output-port tunable matching circuit, a temperature, to obtain one or more "temperature signals", each of the one or more temperature signals being mainly determined by one or more of the temperatures at said one or more locations;

estimating two or more real quantities depending on an impedance seen by the target port, using the sensing unit output signals obtained while the excitation is applied, said two or more real quantities depending on an impedance seen by the target port being sufficient for being able to compute a real part and an imaginary part of the impedance seen by the target port;

using said one or more temperature signals and said two or more real quantities depending on an impedance seen by the target port, to obtain one or more "tuning control signals"; and applying each of the one or more tuning control signals to one or more of the adjustable impedance devices of the tunable matching circuit, the reactance of each of the adjustable impedance devices of the tunable matching circuit being mainly determined by at least one of the one or more tuning control signals.

According to the invention, the given frequency is for instance a frequency greater than or equal to 150 kHz. We will use $Z_{Sant}$ to denote the impedance seen by the target port and $Z_U$ to denote the impedance presented by the user port. $Z_{Sant}$ and $Z_U$ are frequency dependent complex numbers. Thus, the impedance seen by the target port may be referred to as "complex impedance seen by the target port". Said transfer of power from the user port to the target port may be a transfer of power with small or negligible or zero losses, this characteristic being preferred.

At said one or more locations in the single-input-port and single-output-port tunable matching circuit, a temperature is measured. Thus, if said one or more locations in the single-input-port and single-output-port tunable matching circuit comprise two or more locations, two or more temperatures are measured. Said temperature measured at each of said one or more locations in the single-input-port and single-output-port tunable matching circuit may for instance be measured repetitively, for instance once every second.

Each of said two or more real quantities depending on an impedance seen by the target port may for instance be a real quantity representative of the impedance seen by the target port. Each of said two or more real quantities depending on an impedance seen by the target port may for instance be substantially proportional to the absolute value, or the phase, or the real part, or the imaginary part of the impedance seen by the target port, or of the inverse of the impedance seen by the target port (that is, the admittance seen by the target port), or of a voltage reflection coefficient at the target port, defined as being equal to $(Z_{Sant}-Z_O)(Z_{Sant}+Z_O)^{-1}$, where $Z_O$ is a reference impedance.

An adjustable impedance device is a component comprising two terminals which substantially behave as the terminals of a passive linear two-terminal circuit element, and which are consequently fully characterized by an impedance which may depend on frequency, this impedance being adjustable. An adjustable impedance device may be adjustable by mechanical means, for instance a variable resistor, a variable capacitor, a network comprising a plurality of capacitors and one or more switches or change-over switches used to cause different capacitors of the network to contribute to the reactance, a variable inductor, a network comprising a plurality of inductors and one or more switches or change-over switches used to cause different inductors of the network to contribute to the reactance, or a network comprising a plurality of open-circuited or short-circuited stubs and one or more switches or change-over switches used to cause different stubs of the network to contribute to the reactance. We note that all examples in this list, except the variable resistor, are intended to provide an adjustable reactance.

An adjustable impedance device having a reactance which is adjustable by electrical means may be such that it only provides, at said given frequency, a finite set of reactance values, this characteristic being for instance obtained if the adjustable impedance device is:

a network comprising a plurality of capacitors or open-circuited stubs and one or more electrically controlled switches or change-over switches, such as electromechanical relays, or microelectromechanical switches (MEMS switches), or PIN diodes, or insulated-gate field-effect transistors (MOSFETs), used to cause different capacitors or open-circuited stubs of the network to contribute to the reactance; or a network comprising a plurality of coils or short-circuited stubs and one or more electrically controlled switches or change-over switches used to cause different coils or short-circuited stubs of the network to contribute to the reactance.

An adjustable impedance device having a reactance which is adjustable by electrical means may be such that it provides, at said given frequency, a continuous set of reactance values, this characteristic being for instance obtained if the adjustable impedance device is based on the use of a variable capacitance diode; or a MOS varactor; or a microelectromechanical varactor (MEMS varactor); or a ferroelectric varactor.

In contrast to the automatic tuning system using an open-loop control scheme described in the above section about prior art, said one or more temperature signals are used to obtain said one or more tuning control signals. However, the specialist understands that the invention uses an open-loop control scheme, in which said one or more temperature signals and said two or more real quantities depending on an impedance seen by the target port are used to obtain tuning control signals, the tuning control signals having no influence on the impedance seen by the target port.

Let us use r to denote the number of tuning control signals. Following an approach similar to the one used in section II of the article of F. Broydé and E. Clavelier entitled "Some Properties of Multiple-Antenna-Port and Multiple-User-Port Antenna Tuners", published in *IEEE Trans. on Circuits and Systems I: Regular Papers*, Vol. 62, No. 2, pp. 423-432, in February 2015, we may consider a mapping denoted by $g_U$ and defined by $$g_U(f, Z_{Sant}, x_1, \ldots, x_r) = Z_U \quad (1)$$

where f is the frequency and where, the tuning control signals being numbered from 1 to r, for any integer j greater than or equal to 1 and less than or equal to r, we use $x_j$ to denote the value of the tuning control signal number j. The specialist sees that $Z_{Sant}$ is independent of the variables $x_1, \ldots, x_r$, whereas equation (1) shows that $Z_U$ depends on the variables $x_1, \ldots, x_r$.

Experimental results have shown that temperature often also influences $Z_U$, and that a cause of this influence is typically the temperature dependence of the reactance and of the resistance of some types of adjustable impedance devices. If one or more such adjustable impedance devices are used as adjustable impedance devices of the tunable matching circuit, then the mapping $g_U$ only applies to a context in which a suitable set of temperatures is specified. For instance the suitable set of temperatures may consist of the temperature of each of the adjustable impedance devices of the tunable matching circuit, or of a single temperature (for instance if the single-input-port and single-output-port tunable matching circuit is such that the adjustable impedance devices of the tunable matching circuit may be regarded as being almost at the same temperature). Let us use q to denote the number of said one or more locations in the single-input-port and single-output-port tunable matching circuit, and let us use $T_1, \ldots, T_q$ to denote the q temperatures measured at the q locations in the single-input-port and single-output-port tunable matching circuit. If the number and the choice of the locations is appropriate, there exists a mapping denoted by $g_{TU}$ and defined by $$g_{TU}(f, Z_{Sant}, x_1, \ldots, x_r, T_1, \ldots, T_q) = Z_U \quad (2)$$

which applies to any normal thermal environment of the single-input-port and single-output-port tunable matching circuit, that is to say, to any combination of ambient temperature, temperature gradient, nearby heat sources, etc, which may occur under any normal operating conditions of the single-input-port and single-output-port tunable matching circuit. The mapping $g_{TU}$ is a model of the single-input-port and single-output-port tunable matching circuit, applicable to any normal thermal environment of the single-input-port and single-output-port tunable matching circuit. This model takes into account the influences of the frequency, of the impedance seen by the target port, of the tuning control signals and of the temperatures at said one or more locations, on the impedance presented by the user port.

According to the invention, said two or more real quantities depending on an impedance seen by the target port are sufficient for computing $Z_{Sant}$. Additionally, it is possible that said one or more temperature signals provide a sufficiently accurate information on $T_1, \ldots, T_q$. In this case, since said one or more temperature signals and said two or more real quantities depending on an impedance seen by the target port are used to obtain the tuning control signals and consequently to determine the variables $x_1, \ldots, x_r$, equation (2) indicates how, according to the invention, the tuning control signals can be used to automatically and accurately control $Z_U$ in any normal thermal environment of the single-input-port and single-output-port tunable matching circuit. For instance, if we want to obtain that $Z_U$ approximates a wanted impedance denoted by $Z_{UW}$ at a specified frequency $f_0$, an equation such as $$g_{TU}(f_0, Z_{Sant}, x_1, \ldots, x_r, T_1, \ldots, T_q) = Z_{UW} \quad (3)$$

may in some cases be used to implicitly define and compute appropriate values of the tuning control signals, as a function of $f_0$, $Z_{Sant}$, $T_1, \ldots, T_q$ and $Z_{UW}$. For instance, if we want to obtain that $Z_U$ approximates $Z_{UW}$ at the specified frequency $f_0$, an optimization problem such as $$(x_1, \ldots, x_r) = \mathrm{argmin}(|g_{TU}(f_0, Z_{Sant}, x_1, \ldots, x_r, T_1, \ldots, T_q) - Z_{UW}|) \quad (4)$$

may in most cases be used to compute optimal values of the tuning control signals, as a function of $f_0$, $Z_{Sant}$, $T_1, \ldots, T_q$ and $Z_{UW}$. The specialist understands how, in the automatic tuning system, the tuning control signals can be obtained without complex computation, for instance using a lookup table based on solutions of equation (3) or of equation (4).

More generally, the open-loop control scheme automatic tuning system of the invention may take relevant temperatures into account to automatically and accurately determine, in any normal thermal environment, tuning control signals providing an optimal $Z_U$. This may for instance be achieved using a computation and/or data stored in a lookup table, the computation and/or the data stored in the lookup table being explicitly or implicitly based on a model of the single-input-port and single-output-port tunable matching circuit, this model taking into account the influences of the frequency, of the two or more real quantities depending on an impedance seen by the target port, of the tuning control signals and of the temperatures at said one or more locations, on the impedance presented by the user port, or on a quantity determined by the impedance presented by the user port, such as the admittance presented by the user port or the voltage reflection coefficient at the user port. This does not require difficult computations. Thus, the invention can be used to optimally, quickly and automatically adjust a single-input-port and single-output-port tunable matching circuit, without very difficult computations, in spite of the possible presence of losses in the single-input-port and single-output-port tunable matching circuit. Consequently, the invention overcomes the limitations of prior art.

In contrast, since the open-loop control scheme automatic tuning system described in the prior art section does not take relevant temperatures into account to determine the tuning control signals, it cannot provide an accurate tuning if the single-input-port and single-output-port tunable matching circuit is such that the temperature significantly influences $Z_U$.

Equation (4), which is only an example of computation technique, means that the tuning control signals are such that the impedance presented by the user port, computed using equation (2), minimizes the absolute value of the difference between $Z_U$ and $Z_{UW}$. More generally, according to the invention, it is possible that the tuning control signals are such that the impedance presented by the user port, computed using equation (2), decreases or minimizes the absolute value of the image of the impedance presented by the user port under a function, the function being a complex valued function of a complex variable. For instance, said function may be defined by $$h(Z_U) = Z_U - Z_{UW} \quad (5)$$

in which case the image of $Z_U$ under the function is a difference of impedances (that is to say, a difference of complex impedances), as in equation (4), or defined by $$h(Z_U) = Z_U^{-1} - Z_{UW}^{-1} \quad (6)$$

in which case the image of $Z_U$ under the function is a difference of admittances (that is to say, a difference of complex admittances), or defined by $$h(Z_U) = (Z_U - Z_{UW})(Z_U + Z_{UW})^{-1} \quad (7)$$

in which case the image of $Z_U$ under the function is a voltage reflection coefficient at the user port (that is to say, a complex voltage reflection coefficient at the user port). We note that each of these functions is such that $h(Z_{UW})$ is zero.

A first apparatus implementing the method of the invention is an automatic tuning system having a "user port" and a "target port", the automatic tuning system allowing, at a given frequency, a transfer of power from the user port to the target port, the automatic tuning system comprising:

a sensing unit, the sensing unit delivering two or more "sensing unit output signals", each of the sensing unit output signals being mainly determined by one or more electrical variables sensed at the target port;

a single-input-port and single-output-port tunable matching circuit, the single-input-port and single-output-port tunable matching circuit comprising one or more adjustable impedance devices, the one or more adjustable impedance devices being referred to as "the adjustable impedance devices of the tunable matching circuit" and being such that, at said given frequency, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being mainly determined by one or more of the temperatures at said one or more locations;

a signal processing unit, the signal processing unit estimating two or more real quantities depending on an impedance seen by the target port, using the sensing unit output signals obtained while an excitation is applied to the user port, said two or more real quantities depending on an impedance seen by the target port being sufficient for being able to compute a real part and an imaginary part of the impedance seen by the target port, the signal processing unit delivering a "tuning instruction" as a function of said one or more temperature signals and as a function of said two or more real quantities depending on an impedance seen by the target port; and a tuning control unit, the tuning control unit receiving the tuning instruction from the signal processing unit, the tuning control unit delivering one or more "tuning control signals" to the single-input-port and single-output-port tunable matching circuit, said one or more tuning control signals being determined as a function of the tuning instruction, the reactance of each of the adjustable impedance devices of the tunable matching circuit being mainly determined by at least one of the one or more tuning control signals.

A second apparatus implementing the method of the invention is an automatic tuning system having one "user port" and one "target port", the automatic tuning system allowing, at a given frequency, a transfer of power from the user port to the target port, the automatic tuning system comprising:

a sensing unit, the sensing unit delivering two or more "sensing unit output signals", each of the sensing unit output signals being mainly determined by one or more electrical variables sensed at the target port;

a single-input-port and single-output-port tunable matching circuit, the single-input-port and single-output-port tunable matching circuit comprising one or more adjustable impedance devices, the one or more adjustable impedance devices being referred to as "the adjustable impedance devices of the tunable matching circuit" and being such that, at said given frequency, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being mainly determined by one or more of the temperatures at said one or more locations;

a signal processing unit, the signal processing unit estimating two or more real quantities depending on an impedance seen by the target port, using the sensing unit output signals obtained while an excitation is applied to the user port, said two or more real quantities depending on an impedance seen by the target port being sufficient for being able to compute a real part and an imaginary part of the impedance seen by the target port, the signal processing unit delivering a "tuning instruction" as a function of said two or more real quantities depending on an impedance seen by the target port; and a tuning control unit, the tuning control unit receiving the tuning instruction from the signal processing unit, the tuning control unit delivering one or more "tuning control signals" to the single-input-port and single-output-port tunable matching circuit, said one or more tuning control signals being determined as a function of said one or more temperature signals and as a function of the tuning instruction, the reactance of each of the adjustable impedance devices of the tunable matching circuit being mainly determined by at least one of the one or more tuning control signals.

The second apparatus implementing the method of the invention may for instance be such that the tuning instruction is also a function of said one or more temperature signals, so that, in this case, the tuning instruction is delivered as a function of said one or more temperature signals and as a function of said two or more real quantities depending on an impedance seen by the target port.

For instance, each of said electrical variables may be a voltage, or an incident voltage, or a reflected voltage, or a current, or an incident current, or a reflected current.

It is assumed that said single-input-port and single-output-port tunable matching circuit behaves, at said given frequency, with respect to its input port and output port, substantially as a passive linear 2-port device, where "passive" is used in the meaning of circuit theory. As a consequence of linearity, it is possible to define the impedance presented by the input port. As a consequence of passivity, the single-input-port and single-output-port tunable matching circuit does not provide amplification.

It is possible that the input port of the single-input-port and single-output-port tunable matching circuit is coupled, directly or indirectly, to the user port. It is possible that the output port of the single-input-port and single-output-port tunable matching circuit is coupled, indirectly through the sensing unit, to the target port. Thus, said transfer of power from the user port to the target port may take place through the single-input-port and single-output-port tunable matching circuit and through the sensing unit.

The specialist understands that the automatic tuning system of the invention is adaptive in the sense that circuit parameters, namely the reactances of the adjustable impedance devices of the tunable matching circuit, are varied with time as a function of the sensing unit output signals, which are each mainly determined by one or more electrical variables, and as a function of the temperature signals, which are mainly determined by one or more of the temperatures at said one or more locations.

The specialist understands that the tuning instruction may for instance be determined as being a tuning instruction which, among a set of possible tuning instructions, produces an impedance presented by the user port, computed using (2), which decreases or minimizes the absolute value of the image of the impedance presented by the user port under a function, the function being for instance one of the functions h such that $h(Z_U)$ is given by equation (5) or equation (6) or equation (7). The specialist also understands that the tuning instruction may for instance be determined as being a tuning instruction which provides an impedance presented by the user port, computed using equation (2), which is substantially equal to the wanted impedance, for instance a tuning instruction such that $Z_U = Z_{UW}$.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment (Best Mode)

Figure 1:
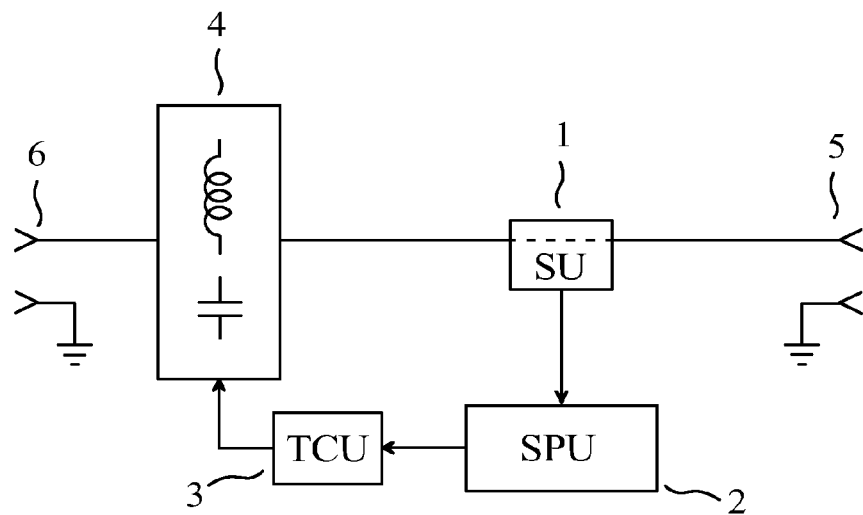
FIG. 1 shows the block diagram of an automatic tuning system, which has already been discussed in the section dedicated to the presentation of the prior art.
Figure 2:
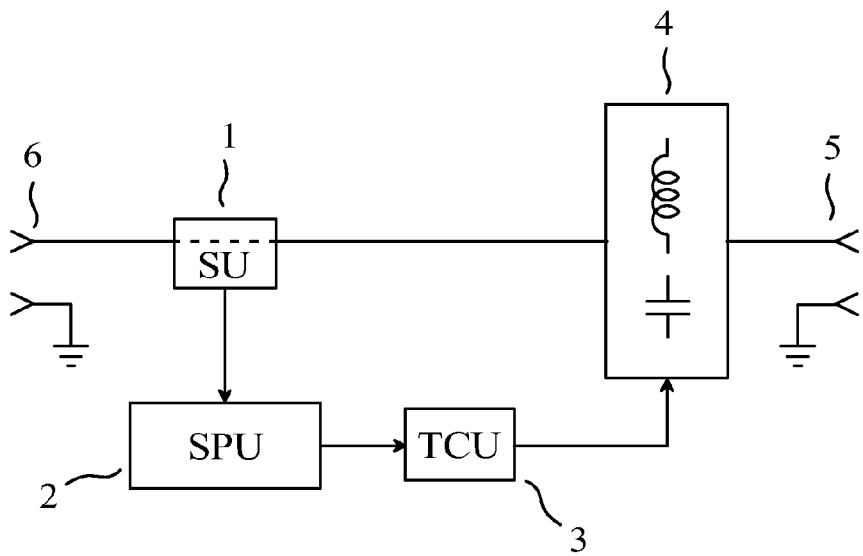
FIG. 2 shows the block diagram of an automatic tuning system, which has already been discussed in the section dedicated to the presentation of the prior art.
Figure 3:
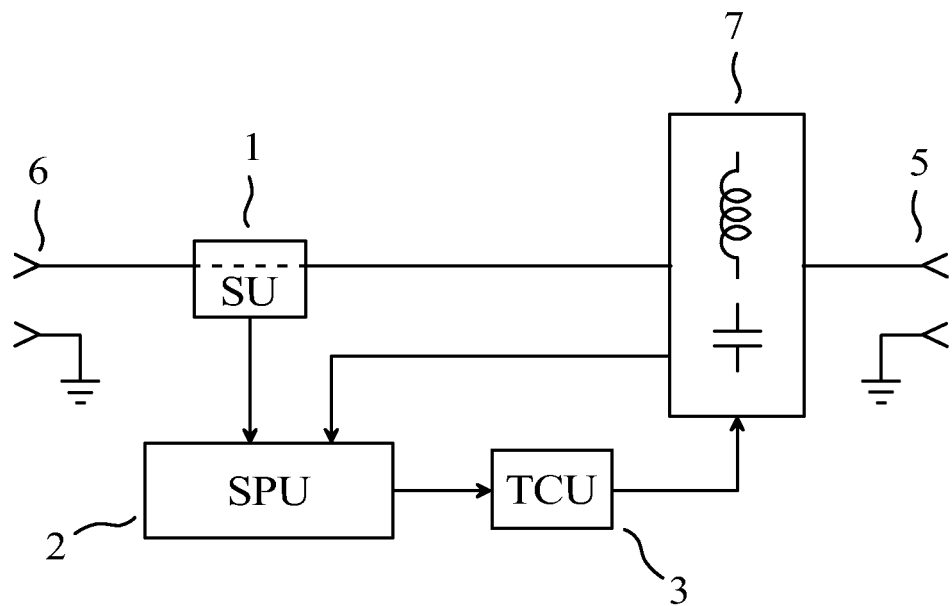
FIG. 3 shows the block diagram of an automatic tuning system of the invention (first embodiment)

As a first embodiment of a device of the invention, given by way of non-limiting example and best mode of carrying out the invention, we have represented in FIG. 3 the block diagram of an automatic tuning system having one user port (5) and one target port (6), the automatic tuning system allowing, at a given frequency greater than or equal to 30 MHz, a transfer of power from the user port to the target port, the automatic tuning system comprising:

a sensing unit (1), the sensing unit delivering two "sensing unit output signals", each of the sensing unit output signals being determined by one electrical variable sensed at the target port;

a single-input-port and single-output-port tunable matching circuit (7), the single-input-port and single-output-port tunable matching circuit comprising one or more adjustable impedance devices, the one or more adjustable impedance devices being referred to as "the adjustable impedance devices of the tunable matching circuit" and being such that, at said given frequency, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being determined by one of the temperatures at said one or more locations;

a signal processing unit (2), the signal processing unit estimating two or more real quantities depending on an impedance seen by the target port, using the sensing unit output signals obtained while an excitation is applied to the user port, the signal processing unit delivering a "tuning instruction" as a function of said one or more temperature signals and as a function of said two or more real quantities depending on an impedance seen by the target port; and a tuning control unit (3), the tuning control unit receiving the tuning instruction from the signal processing unit (2), the tuning control unit delivering one or more "tuning control signals" to the single-input-port and single-output-port tunable matching circuit, said one or more tuning control signals being determined as a function of the tuning instruction, the reactance of each of the adjustable impedance devices of the tunable matching circuit being determined by at least one of the one or more tuning control signals.

The two or more real quantities depending on an impedance seen by the target port are such that they are sufficient for being able to compute the impedance seen by the target port. In other words, they are such that they are sufficient for allowing a computation of the impedance seen by the target port. The wording "such that they are sufficient for being able to compute the impedance seen by the target port" does not imply that the impedance seen by the target port is computed, but it is possible that the impedance seen by the target port is computed. Since, in the two previous sentences, "impedance" means "complex impedance", the requirement "the two or more real quantities depending on an impedance seen by the target port are such that they are sufficient for being able to compute the impedance seen by the target port" is equivalent to "the two or more real quantities depending on an impedance seen by the target port are such that they are sufficient for being able to compute a real part and an imaginary part of the impedance seen by the target port". The wording "such that they are sufficient for being able to compute a real part and an imaginary part of the impedance seen by the target port" does not imply that the real part and the imaginary part of the impedance seen by the target port are computed, but it is possible that the real part and the imaginary part of the impedance seen by the target port are computed.

The information carried by the sensing unit output signals must be sufficient to allow the signal processing unit to estimate two or more real quantities depending on an impedance seen by the target port, the two or more real quantities depending on an impedance seen by the target port being such that they are sufficient for being able to compute the impedance seen by the target port. The sensing unit (1) may for instance be such that the two sensing unit output signals comprise: a first sensing unit output signal proportional to a first electrical variable, the first electrical variable being a voltage across the target port; and a second sensing unit output signal proportional to a second electrical variable, the second electrical variable being a current flowing out of the target port. Said voltage across the target port may be a complex voltage and said current flowing out of the target port may be a complex current. Alternatively, the sensing unit (1) may for instance be such that the two sensing unit output signals comprise: a first sensing unit output signal proportional to a first electrical variable, the first electrical variable being an incident voltage (which may also be referred to as "forward voltage") at the target port; and a second sensing unit output signal proportional to a second electrical variable, the second electrical variable being a reflected voltage at the target port. Said incident voltage at the target port may be a complex incident voltage and said reflected voltage at the target port may be a complex reflected voltage.

Each of the electrical variables is substantially zero if no signal is applied to the user port and if no signal is applied to the target port.

An external device has an output port, the output port of the external device being coupled to the user port. The external device is not shown in FIG. 3. The external device applies the excitation to the user port. The external device also delivers one or more "instructions of the external device" to the signal processing unit (2), said instructions of the external device informing the signal processing unit that said excitation has been applied, or is being applied, or will be applied. For instance, the external device may initiate a tuning sequence when it informs the signal processing unit that it will apply the excitation to the user port. For instance, the signal processing unit may end the tuning sequence when, after the excitation has been applied, a tuning instruction has been delivered. Additionally, the external device provides one or more other signals to the signal processing unit, and/or receives one or more other signals from the signal processing unit. The electrical links needed to deliver said instructions of the external device and to carry such other signals are not shown in FIG. 3.

The excitation applied to the user port may for instance comprise a sinusoidal signal at said given frequency. The excitation applied to the user port may for instance comprise a sinusoidal signal at a frequency different from said given frequency, or a modulated sinusoidal signal. The two or more real quantities depending on an impedance seen by the target port may consist of a real number proportional to the real part of $Z_{Sant}$ and of a real number proportional to the imaginary part of $Z_{Sant}$. The specialist understands how the signal processing unit can process the sensing unit output signals, to obtain a real number proportional to the real part of $Z_{Sant}$ and a real number proportional to the imaginary part of $Z_{Sant}$. For instance, let us assume that the sensing unit delivers: a first sensing unit output signal proportional to the voltage across the target port; and a second sensing unit output signal proportional to the current flowing out of the target port. The signal processing unit may for instance perform an in-phase/quadrature (I/Q) demodulation (homodyne reception) of these sensing unit output signals, to obtain four analog signals. These analog signals may then be converted into digital signals and further processed in the digital domain, to estimate the real part of $Z_{Sant}$ and the imaginary part of $Z_{Sant}$.

The signal processing unit (2) receives said one or more temperature signals provided by the single-input-port and single-output-port tunable matching circuit, as shown in FIG. 3. The signal processing unit also receives the value of the frequency of the excitation applied to the user port, regarded here as a specified frequency $f_0$, this value being carried by one of said one or more other signals. The signal processing unit knows a wanted impedance at the specified frequency $f_0$, this wanted impedance being denoted by $Z_{UW}$. The signal processing unit also knows a model of the single-input-port and single-output-port tunable matching circuit, this model taking into account the influences of the frequency $f_0$, of the two or more real quantities depending on an impedance seen by the target port, of the tuning instruction and of the temperatures at said one or more locations, on the impedance presented by the user port $Z_U$. This model is used to deliver the tuning instruction. This model includes: for each of the adjustable impedance devices of the tunable matching circuit, a lookup table about the characteristics of said each of the adjustable impedance devices of the tunable matching circuit; and one or more formulas for computing $Z_U$.

The tuning instruction may be of any type of digital message. In this first embodiment, an adaptive process is carried out by the signal processing unit, during one or more tuning sequences. The adaptive process is the following: during each of said tuning sequences, the signal processing unit estimates the two or more real quantities depending on an impedance seen by the target port, and uses an algorithm to determine the tuning instruction, the tuning instruction being such that a "predicted impedance" determined using the model, the predicted impedance being intended to be ideally equal to the impedance presented by the user port (here, ideally means: if the model is very accurate), is as close as possible to the wanted impedance. Thus, the algorithm must find a tuning instruction such that the predicted impedance, computed using said one or more formulas for computing $Z_U$, is optimized to be as close as possible to the wanted impedance $Z_{UW}$. The adaptive process carried out by the signal processing unit requires neither difficult computations nor a long time because the algorithm directly uses the frequency $f_0$, the two or more real quantities depending on an impedance seen by the target port, and the temperatures at said one or more locations, to determine the tuning instruction. Consequently, the invention can be used to optimally, quickly and automatically adjust a single-input-port and single-output-port tunable matching circuit, without very difficult computations, in spite of the presence of losses in the single-input-port and single-output-port tunable matching circuit.

The tuning instruction determined as explained above is such that the tuning control signals are such that the impedance presented by the user port, at a specified frequency, approximates a wanted impedance (which may depend on this specified frequency), in any normal thermal environment of the single-input-port and single-output-port tunable matching circuit. This result is obtained because the tuning instruction is determined in such a way that the tuning control signals are such that, at said specified frequency, a predicted impedance approximates the wanted impedance (which may depend on the specified frequency), the predicted impedance being determined using a model of the single-input-port and single-output-port tunable matching circuit, this model taking into account the influences of the two or more real quantities depending on an impedance seen by the target port, and of a temperature at each of said one or more locations, on the impedance presented by the user port, or on a quantity determined by the impedance presented by the user port, such as the admittance presented by the user port or the voltage reflection coefficient at the user port.

It is important to note that in many cases, the real part and the imaginary part of the impedance of one of the adjustable impedance devices of the tunable matching circuit both depend on one or more tuning control signals and on a temperature. In fact, a typical adjustable impedance device is often optimized to provide a relatively low temperature dependence of the reactance, so that the relative variation of the resistance is often larger than the relative variation of the reactance, for a given temperature variation. For instance, the article of J. Nath, W. M. Fathelbab, P. G. Lam, D. Ghosh, S. Aygün, K. G. Gard, J.-P. Maria, A. I. Kingon and M. B. Steer, entitled "Discrete Barium Strontium Titanate (BST) Thin-Film Interdigital Varactors on Alumina: Design, Fabrication, Characterization, and Applications", published in 2006 *IEEE MTT-S International Microwave Symposium Digest*, pp. 552-555, in June 2006, shows that the capacitance and the loss tangent of a barium strontium titanate ferroelectric varactor both depend on the applied bias voltage and on the temperature. In this article, over the temperature range 0° C. to 70° C., the relative loss tangent variation was found to be much larger than the relative capacitance variation. The specialist understands that, in this context, to obtain that $Z_U$ is as close as possible to $Z_{UW}$, the tuning instruction and the tuning control signals will typically be such that the reactance of any one of the adjustable impedance devices of the tunable matching circuit must vary if the temperature varies. Thus, the automatic tuning system described in this first embodiment does not implement any form of reactance regulation, in which the tuning instruction and the tuning control signals would be such that the reactance of any one of the adjustable impedance devices of the tunable matching circuit should not vary if the temperature varies.

The signal processing unit may also estimate one or more quantities each depending on the power delivered by the target port. For instance, such quantities each depending on the power delivered by the target port may be used to control the power delivered by the target port, by varying the power delivered to the user port.

The reactance of any one of the adjustable impedance devices of the tunable matching circuit has an influence on the impedance presented by the user port. More precisely, the reactance of any one of the adjustable impedance devices of the tunable matching circuit has, at said given frequency, if the impedance seen by the target port is equal to a given impedance, an influence on the impedance presented by the user port.

Moreover, the single-input-port and single-output-port tunable matching circuit has a full tuning capability (the definition of which is given in section III of said article entitled "Some Properties of Multiple-Antenna-Port and Multiple-User-Port Antenna Tuners"). Thus, the specialist understands that any small variation in the impedance seen by the target port can be completely compensated with a new automatic adjustment of the adjustable impedance devices of the tunable matching circuit. The characteristics of the single-input-port and single-output-port tunable matching circuit are such that the automatic tuning system allows, at said given frequency, a low-loss transfer of power from the user port to the target port, and a low-loss transfer of power from the target port to the user port.

If the automatic tuning system has its target port directly or indirectly coupled to an antenna, the specialist understands that $Z_{Sant}$ depends on the frequency and on the electromagnetic characteristics of the volume surrounding the antenna. In particular, if the antenna is built in a portable transceiver, for instance a user equipment (UE) of an LTE wireless network, the body of the user has an effect on $Z_{Sant}$, and $Z_{Sant}$ depends on the position of the body of the user. This is referred to as "user interaction", or "hand effect" or "finger effect". The specialist understands that the automatic tuning system may be used to compensate a variation in $Z_{Sant}$ caused by a variation in the frequency of operation, and/or to compensate the user interaction.

In order to respond to variations in $Z_{Sant}$ and/or in the temperatures at said one or more locations and/or in the operating frequency, the tuning instruction may be generated repeatedly. For instance, a new tuning sequence ending with the delivery of a new tuning instruction may start periodically, for instance every 10 milliseconds.

Second Embodiment

Figure 4:
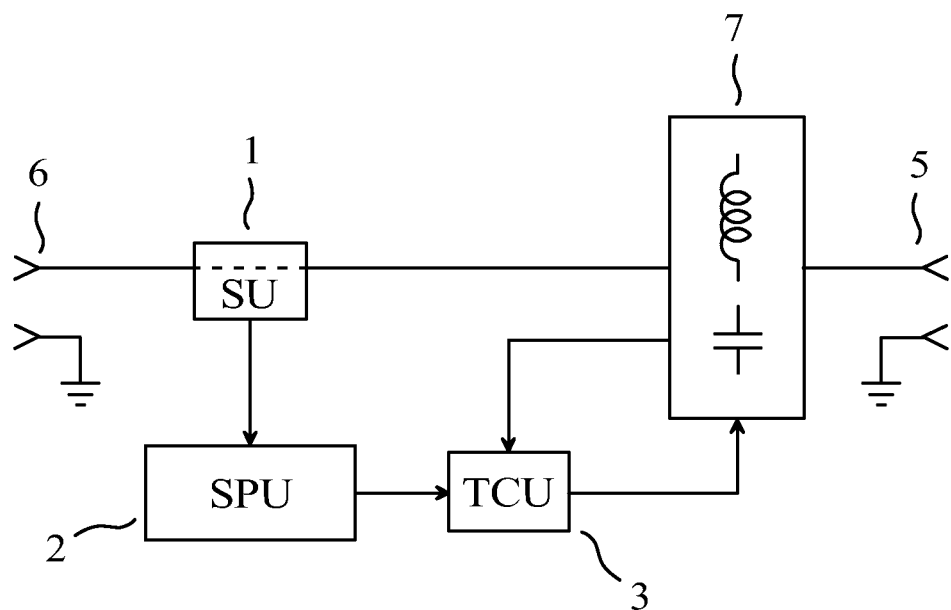
FIG. 4 shows the block diagram of an automatic tuning system of the invention (second embodiment)

As a second embodiment of a device of the invention, given by way of non-limiting example, we have represented in FIG. 4 the block diagram of an automatic tuning system having one user port (5) and one target port (6), the automatic tuning system allowing, at a given frequency greater than or equal to 30 MHz, a transfer of power from the user port to the target port, the automatic tuning system comprising:

a sensing unit (1), the sensing unit delivering two "sensing unit output signals", each of the sensing unit output signals being determined by one electrical variable sensed at the target port;

a single-input-port and single-output-port tunable matching circuit (7), the single-input-port and single-output-port tunable matching circuit comprising one or more adjustable impedance devices, the one or more adjustable impedance devices being referred to as "the adjustable impedance devices of the tunable matching circuit" and being such that, at said given frequency, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being determined by one or more of the temperatures at said one or more locations;

a signal processing unit (2), the signal processing unit estimating two or more real quantities depending on an impedance seen by the target port, using the sensing unit output signals obtained while an excitation is applied to the user port, the signal processing unit delivering a "tuning instruction" as a function of said two or more real quantities depending on an impedance seen by the target port; and a tuning control unit (3), the tuning control unit receiving the tuning instruction from the signal processing unit (2), the tuning control unit delivering one or more "tuning control signals" to the single-input-port and single-output-port tunable matching circuit, said one or more tuning control signals being determined as a function of said one or more temperature signals and as a function of the tuning instruction, the reactance of each of the adjustable impedance devices of the tunable matching circuit being determined by at least one of the one or more tuning control signals.

The two or more real quantities depending on an impedance seen by the target port are such that they are sufficient for being able to compute the impedance seen by the target port.

An external device has an output port, the output port of the external device being coupled to the user port. The external device is not shown in FIG. 4. The external device applies the excitation to the user port. The external device also delivers one or more "instructions of the external device" to the signal processing unit (2). The electrical links needed to deliver said instructions of the external device are not shown in FIG. 4.

In this second embodiment, the excitation is a bandpass signal. This type of signal is sometimes improperly referred to as "passband signal" or "narrow-band signal" (in French: "signal à bande étroite"). A bandpass signal is any real signal s(t), where t denotes the time, such that the spectrum of s(t) is included in a frequency interval $[f_C-W/2, f_C+W/2]$, where $f_C$ is a frequency referred to as "carrier frequency" and where W is a frequency referred to as "bandwidth", which satisfies $W<2f_C$. Thus, the Fourier transform of s(t), denoted by S(f), is non-negligible only in the frequency intervals $[-f_C-W/2, -f_C+W/2]$ and $[f_C-W/2, f_C+W/2]$. The complex envelope of the real signal s(t), also referred to as "complex baseband equivalent" or "baseband-equivalent signal", is a complex signal $s_B(t)$ whose Fourier transform $S_B(f)$ is non-negligible only in the frequency interval $[-W/2, W/2]$ and satisfies $S_B(f)=k\,S(f_C+f)$ in this interval, where k is a real constant which is chosen equal to the square root of 2 by some authors. The real part of $s_B(t)$ is referred to as the in-phase component, and the imaginary part of $s_B(t)$ is referred to as the quadrature component. The specialist knows that the bandpass signal s(t) may for instance be obtained:

- as the result of a phase and amplitude modulation of a single carrier at the frequency $f_C$;
- as a linear combination of a first signal and a second signal, the first signal being the product of the in-phase component and a first sinusoidal carrier of frequency $f_C$, the second signal being the product of the quadrature component and a second sinusoidal carrier of frequency $f_C$, the second sinusoidal carrier being 90° out of phase with respect to the first sinusoidal carrier;
- in other ways, for instance without using any carrier, for instance using directly a filtered output of a digital-to-analog converter.

The frequency interval $[f_C-W/2, f_C+W/2]$ is a passband of the bandpass signal. From the definitions, it is clear that, for a given bandpass signal, several choices of carrier frequency $f_C$ and of bandwidth W are possible, so that the passband of the bandpass signal is not uniquely defined. However, any passband of the bandpass signal must contain any frequency at which the spectrum of s(t) is not negligible.

The complex envelope of the real signal s(t) clearly depends on the choice of a carrier frequency $f_C$. However, for a given carrier frequency, the complex envelope of the real signal s(t) is uniquely defined, for a given choice of the real constant k.

The excitation being a bandpass signal, it is possible to show that, if the bandwidth of the excitation is sufficiently narrow, then any voltage or current measured at the target port and caused by the excitation is a bandpass signal a complex envelope of which is proportional to the complex envelope of the excitation, the coefficient of proportionality being complex and time-independent. Thus, we may consider that the excitations causes, at the target port: a current flowing out of the target port, of complex envelope $i_{TP}(t)$; and a voltage across the target port, of complex envelope $v_{TP}(t)$. If the bandwidth of the complex envelope of the excitation is sufficiently narrow, we have $$v_{TP}(t)=Z_{Sant}i_{TP}(t) \quad (8)$$

where $Z_{Sant}$ is the impedance seen by the target port, at the carrier frequency.

The two or more real quantities depending on an impedance seen by the target port may consist of a real number proportional to the absolute value of the admittance seen by the target port, and of a real number proportional to a phase of the admittance seen by the target port. The specialist understands how the signal processing unit can process the sensing unit output signals, to obtain a real number proportional to the absolute value of the admittance seen by the target port, and a real number proportional to a phase of the admittance seen by the target port. For instance, let us assume that the sensing unit delivers: a first sensing unit output signal proportional to the voltage across the target port; and a second sensing unit output signal proportional to the current flowing out of the target port. The signal processing unit may for instance perform a down-conversion of the sensing unit output signals, followed by an in-phase/quadrature (I/Q) demodulation (heterodyne reception), to obtain four analog signals, proportional to the real part of $v_{TP}(t)$, the imaginary part of $v_{TP}(t)$, the real part of $i_{TP}(t)$, and the imaginary part of $i_{TP}(t)$, respectively. These analog signals may then be converted into digital signals and further processed in the digital domain, based on equation (8), to estimate the absolute value of the admittance seen by the target port, and the phase of the admittance seen by the target port.

The tuning control unit (3) receives said one or more temperature signals provided by the single-input-port and single-output-port tunable matching circuit, as shown in FIG. 4.

The tuning instruction may be of any type of digital message. In this second embodiment, an adaptive process is carried out by the signal processing unit and the tuning control unit, during one or more tuning sequences. The adaptive process is the following: during each of said tuning sequences, the signal processing unit determines the frequency of operation (that is to say, the carrier frequency), estimates the two or more real quantities depending on an impedance seen by the target port, and uses a lookup table to determine the tuning instruction, based on the frequency of operation and on the two or more real quantities depending on an impedance seen by the target port. The specialist understands how to build and use such a lookup table. The tuning control unit processes the tuning instruction and said one or more temperature signals, to deliver the tuning control signals. The tuning control signals determined as explained above are such that the admittance presented by the user port, at a specified frequency, approximates a wanted admittance, in any normal thermal environment of the single-input-port and single-output-port tunable matching circuit. The adaptive process carried out by the signal processing unit and the tuning control unit requires neither difficult computations nor a long time. Consequently, the invention can be used to optimally, quickly and automatically adjust a single-input-port and single-output-port tunable matching circuit, without very difficult computations, in spite of the presence of losses in the single-input-port and single-output-port tunable matching circuit.

Third Embodiment

The third embodiment of a device of the invention, given by way of non-limiting example, also corresponds to the automatic tuning system shown in FIG. 3, and all explanations provided for the first embodiment are applicable to this third embodiment. Additionally, we have represented in FIG. 5 the single-input-port and single-output-port tunable matching circuit (7) used in this third embodiment. This single-input-port and single-output-port tunable matching circuit comprises:

- an output port (701) having two terminals (7011) (7012), the output port being single-ended;

an input port (702) having two terminals (7021) (7022), the input port being single-ended; a coil (705);

two adjustable impedance devices of the tunable matching circuit (703) (704), each presenting a negative reactance;

a temperature measurement device (75) comprising two temperature sensors (751) (752), the temperature measurement device measuring, at the location of each of the temperature sensors, a temperature, to obtain one or more temperature signals, each of the one or more temperature signals being mainly determined by the temperature at the location of one of the temperature sensors;

an electromagnetic screen (78), which is grounded.

Figure 5:
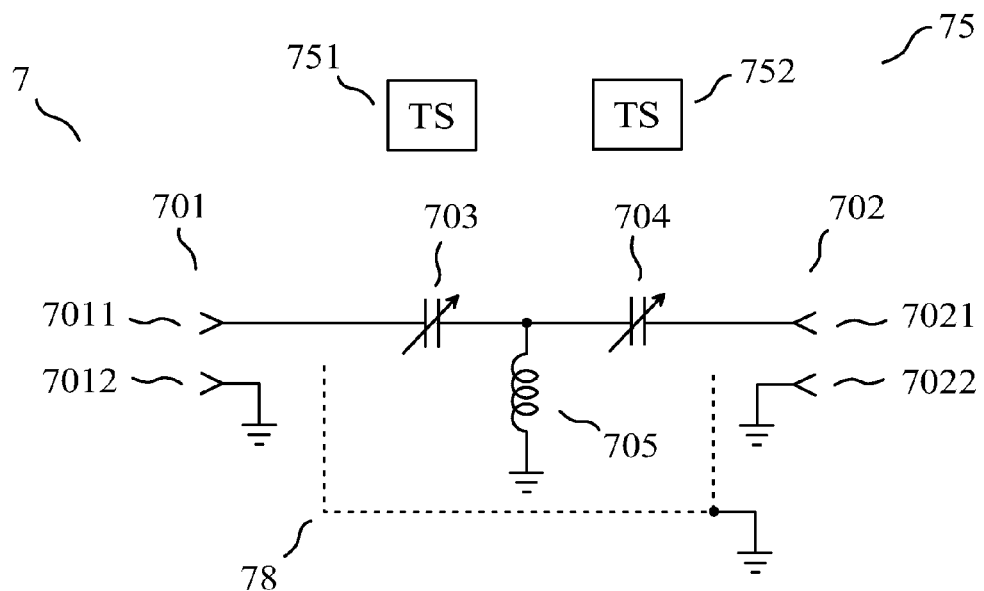
FIG. 5 shows a schematic diagram of a single-input-port and single-output-port tunable matching circuit, which may be used in the automatic tuning system shown in FIG. 3 (third embodiment)

All said adjustable impedance devices of the tunable matching circuit (703) (704) are adjustable by electrical means, but the circuits and the control links needed to adjust the reactance of each of the adjustable impedance devices of the tunable matching circuit are not shown in FIG. 5. The links needed to power feed the temperature sensors (751) (752) and to carry said one or more temperature signals are not shown in FIG. 5.

As shown in FIG. 3 and FIG. 5, the output port (701) is indirectly coupled to the target port (6) through the sensing unit (1), and the input port (702) is directly coupled to the user port (5). Thus, at said given frequency, the impedance presented by the input port is equal to the impedance presented by the user port. The sensing unit is such that, at said given frequency, the impedance seen by the output port is close to the impedance seen by the target port. The specialist understands that, at a frequency at which the single-input-port and single-output-port tunable matching circuit is intended to operate, the reactance of any one of the adjustable impedance devices of the tunable matching circuit has an influence on the impedance presented by the user port.

Experimental results have shown that the electromagnetic characteristics of the volume surrounding the single-input-port and single-output-port tunable matching circuit often influence $Z_U$. The specialist understands that this phenomenon may be detrimental to the automatic tuning system of the invention, because the invention uses an open-loop control scheme. Experimental results have shown that this phenomenon may be mitigated by reducing the variable electromagnetic field produced by the single-input-port and single-output-port tunable matching circuit outside the single-input-port and single-output-port tunable matching circuit. In FIG. 5, an appropriate reduction of this electromagnetic field is provided by the electromagnetic screen (78), which may also be referred to as electromagnetic shield, and which is connected to a ground plane of the printed circuit board on which the single-input-port and single-output-port tunable matching circuit is built.

A first one of the temperature sensors (751) is located near a first one of the adjustable impedance devices of the tunable matching circuit (703), in such a way that it measures a temperature which is close to the temperature of said first one of the adjustable impedance devices of the tunable matching circuit. A second one of the temperature sensors (752) is located near a second one of the adjustable impedance devices of the tunable matching circuit (704), in such a way that it measures a temperature which is close to the temperature of said second one of the adjustable impedance devices of the tunable matching circuit. In this manner, the one or more temperature signals provide information on the temperatures of each of the adjustable impedance devices of the tunable matching circuit, which may be different from one another. The specialist understands that these temperatures may in particular be different if a significant high-frequency power is transferred from the user port to the target port, because the powers dissipated in the adjustable impedance devices of the tunable matching circuit are typically different from one another.

In this third embodiment, two adjustable impedance devices of the tunable matching circuit are used. Thus, it is possible that the number of adjustable impedance devices of the tunable matching circuit is greater than or equal to 2. As explained in said article entitled "Some Properties of Multiple-Antenna-Port and Multiple-User-Port Antenna Tuners", this is necessary to obtain a full tuning capability.

In this third embodiment, two temperature sensors are used, to measure, at two locations in the single-input-port and single-output-port tunable matching circuit, a temperature. Thus, it is possible that the number of locations in the single-input-port and single-output-port tunable matching circuit, at which a temperature is measured, is greater than or equal to 2.

Fourth Embodiment

The fourth embodiment of a device of the invention, given by way of non-limiting example, also corresponds to the automatic tuning system shown in FIG. 3, and all explanations provided for the first embodiment are applicable to this fourth embodiment. Additionally, we have represented in FIG. 6 the single-input-port and single-output-port tunable matching circuit (7) used in this fourth embodiment. This single-input-port and single-output-port tunable matching circuit comprises:

an output port (701) having two terminals (7011) (7012), the output port being single-ended;

an input port (702) having two terminals (7021) (7022), the input port being single-ended; one adjustable impedance device of the tunable matching circuit (706), presenting a positive reactance;

two adjustable impedance devices of the tunable matching circuit (707) (708), each presenting a negative reactance;

a temperature measurement device (75) comprising a single temperature sensor (753), the temperature measurement device measuring, at the location of the temperature sensor, a temperature, to obtain one or more temperature signals, each of the one or more temperature signals being mainly determined by the temperature at the location of the temperature sensor;

an electromagnetic screen (78), which is grounded.

Figure 6:
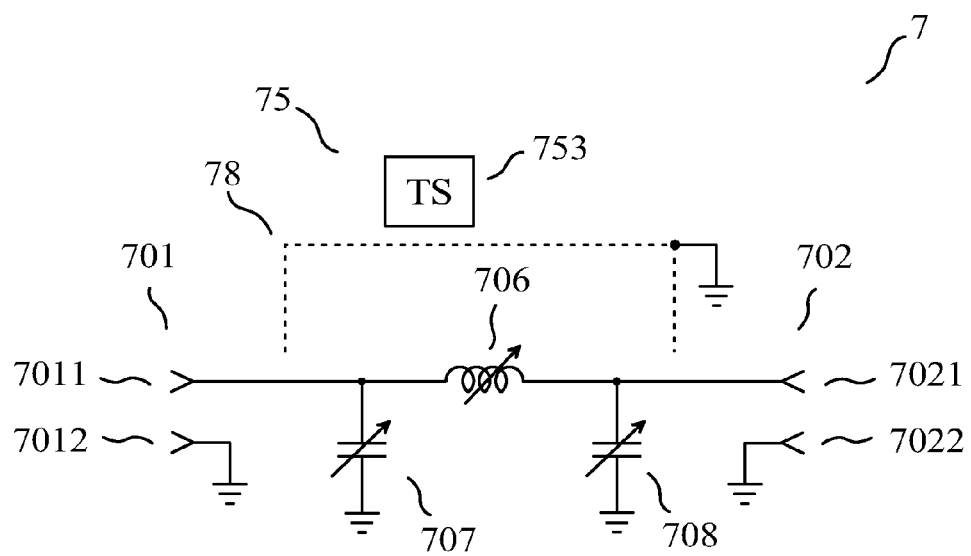
FIG. 6 shows a schematic diagram of a single-input-port and single-output-port tunable matching circuit, which may be used in the automatic tuning system shown in FIG. 3 (fourth embodiment)

All said adjustable impedance devices of the tunable matching circuit (706) (707) (708) are adjustable by electrical means, but the circuits and the control links needed to adjust the reactance of each of the adjustable impedance devices of the tunable matching circuit are not shown in FIG. 6. The links needed to power feed the temperature sensor (753) and to carry said one or more temperature signals are not shown in FIG. 6.

In this fourth embodiment, the electromagnetic screen (78) forms an enclosure containing all said adjustable impedance devices of the tunable matching circuit (706) (707) (708), in which the temperature is almost uniform. This is why a single temperature sensor is used.

In this fourth embodiment, three adjustable impedance devices of the tunable matching circuit are used. Thus, it is possible that the number of adjustable impedance devices of the tunable matching circuit is greater than or equal to 3.

Fifth Embodiment

The fifth embodiment of a device of the invention, given by way of non-limiting example, also corresponds to the automatic tuning system shown in FIG. 4, and all explanations provided for the second embodiment are applicable to this fifth embodiment. Additionally, we have represented in FIG. 7 the single-input-port and single-output-port tunable matching circuit (7) used in this fifth embodiment. This single-input-port and single-output-port tunable matching circuit comprises:
- an output port (701) having two terminals (7011) (7012), the output port being symmetrical (i.e., balanced);
- an input port (702) having two terminals (7021) (7022), the input port being single-ended;
- a coil (705);
- a transformer (709);
- two adjustable impedance devices of the tunable matching circuit (703) (704), each presenting a negative reactance;
- a temperature measurement device comprising three temperature sensors (751) (752) (754), the temperature measurement device measuring, at the location of each of the temperature sensors, a temperature, to obtain one or more temperature signals, each of the one or more temperature signals being mainly determined by the temperature at the location of one of the temperature sensors.

Figure 7:
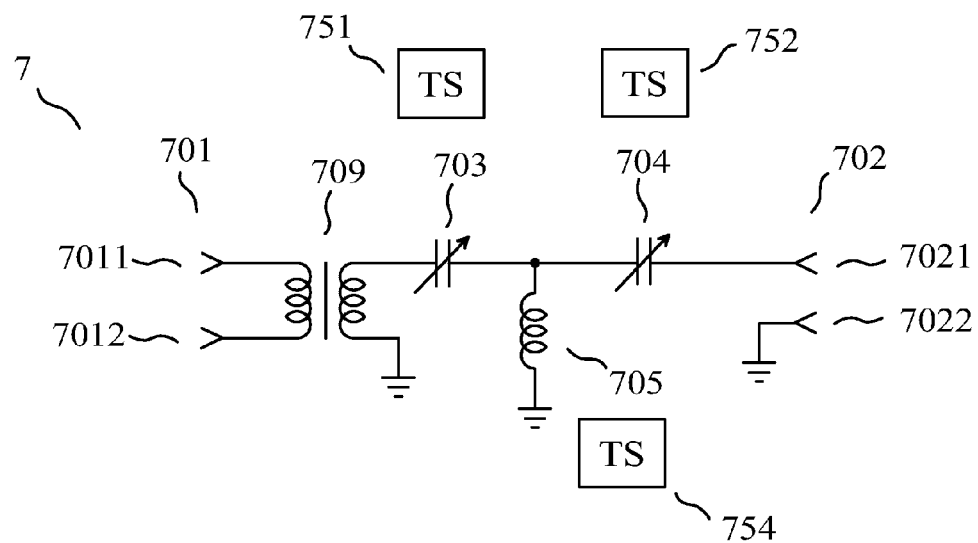
FIG. 7 shows a schematic diagram of a single-input-port and single-output-port tunable matching circuit, which may be used in the automatic tuning system shown in FIG. 4 (fifth embodiment)

All said adjustable impedance devices of the tunable matching circuit (703) (704) are adjustable by electrical means, but the circuits and the control links needed to adjust the reactance of each of the adjustable impedance devices of the tunable matching circuit are not shown in FIG. 7. The links needed to carry said one or more temperature signals are not shown in FIG. 7.

A first one of the temperature sensors (751) is located near a first one of the adjustable impedance devices of the tunable matching circuit (703), in such a way that it measures a temperature which is close to the temperature of said first one of the adjustable impedance devices of the tunable matching circuit. A second one of the temperature sensors (752) is located near a second one of the adjustable impedance devices of the tunable matching circuit (704), in such a way that it measures a temperature which is close to the temperature of said second one of the adjustable impedance devices of the tunable matching circuit. A third one of the temperature sensors (754) is located near the coil (705), in such a way that it measures a temperature which is close to the temperature of the coil. In this manner, the one or more temperature signals provide information on the temperatures of the coil and of each of the adjustable impedance devices of the tunable matching circuit, which may be different from one another. The specialist understands that these temperatures may in particular be different if a significant high-frequency power is transferred from the user port to the target port. The coil used in this fifth embodiment comprises a ferrite core, so that its inductance and its losses depend on the coil's temperature. This is why the third one of the temperature sensors (754) is present.

In this fifth embodiment, the transformer (709) is used to obtain a symmetrical output port. Such a transformer is often referred to as a balun. The output port being symmetrical, the target port is symmetrical.

More generally, according to the invention, it is possible that the input port and/or the output port of the single-input-port and single-output-port tunable matching circuit are single-ended, and it is possible that the input port and/or the output port of the single-input-port and single-output-port tunable matching circuit are balanced or symmetrical. Thus, according to the invention, it is possible that the target port and/or the user port are single-ended, and it is possible that the target port and/or the user port are balanced or symmetrical.

In this fifth embodiment, three temperature sensors are used, to measure, at three locations in the single-input-port and single-output-port tunable matching circuit, a temperature. Thus, it is possible that the number of locations in the single-input-port and single-output-port tunable matching circuit, at which a temperature is measured, is greater than or equal to 3.

Sixth Embodiment

Figure 8:
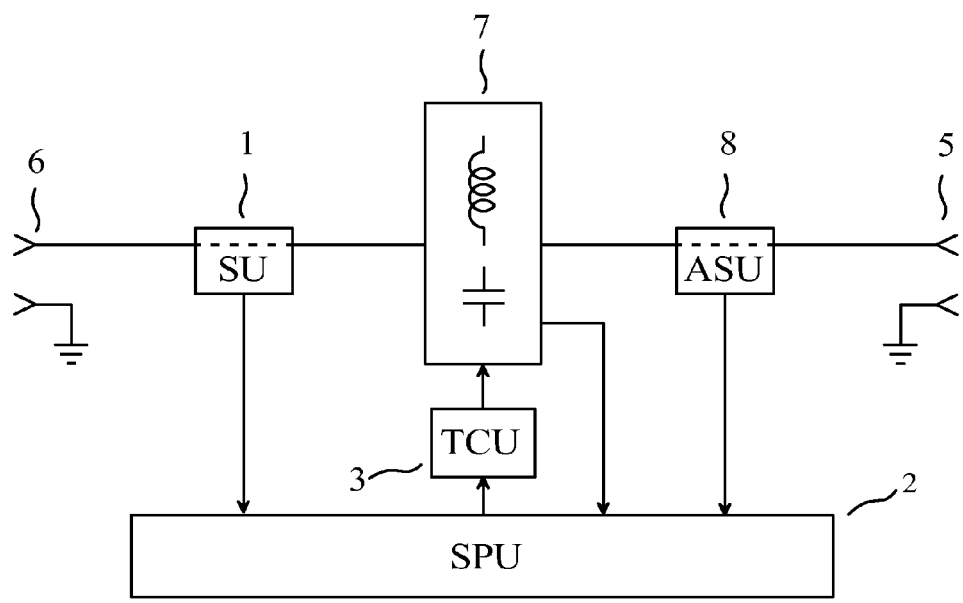
FIG. 8 shows the block diagram of an automatic tuning system of the invention (sixth embodiment)

As a sixth embodiment of a device of the invention, given by way of non-limiting example, we have represented in FIG. 8 the block diagram of an automatic tuning system having one user port (5) and one target port (6), the automatic tuning system allowing, at a given frequency greater than or equal to 300 MHz, a transfer of power from the user port to the target port, the automatic tuning system comprising:
- a sensing unit (1), the sensing unit delivering two "sensing unit output signals", each of the sensing unit output signals being mainly determined by one electrical variable sensed at the target port;
- an additional sensing unit (8), the additional sensing unit delivering one or more "additional sensing unit output signals", each of the one or more additional sensing unit output signals being mainly determined by one or more electrical variables sensed at the user port;
- a single-input-port and single-output-port tunable matching circuit (7), the single-input-port and single-output-port tunable matching circuit comprising one or more adjustable impedance devices, the one or more adjustable impedance devices being referred to as "the adjustable impedance devices of the tunable matching circuit" and being such that, at said given frequency, each of the adjustable impedance devices of the tunable matching circuit has a reactance, the reactance of any one of the adjustable impedance devices of the tunable matching circuit having an influence on an impedance presented by the user port, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being mainly determined by one or more of the temperatures at said one or more locations;
- a signal processing unit (2), the signal processing unit estimating two or more real quantities depending on an impedance seen by the target port, using the sensing unit output signals obtained while an excitation is applied to the user port, the signal processing unit delivering a "tuning instruction" as a function of said one or more temperature signals and as a function of said two or more real quantities depending on an impedance seen by the target port, using the additional sensing unit output signals; and a tuning control unit (3), the tuning control unit receiving the tuning instruction from the signal processing unit (2), the tuning control unit delivering one or more "tuning control signals" to the single-input-port and single-output-port tunable matching circuit, said one or more tuning control signals being determined as a function of the tuning instruction, the reactance of each of the adjustable impedance devices of the tunable matching circuit being mainly determined by at least one of the one or more tuning control signals.

As in the first embodiment, the sensing unit (1) may for instance be such that the two sensing unit output signals comprise: a first sensing unit output signal proportional to a first electrical variable, the first electrical variable being a voltage across the target port; and a second sensing unit output signal proportional to a second electrical variable, the second electrical variable being a current flowing out of the target port. Said voltage across the target port may be a complex voltage and said current flowing out of the target port may be a complex current. Alternatively, the sensing unit (1) may for instance be such that the two sensing unit output signals comprise: a first sensing unit output signal proportional to a first electrical variable, the first electrical variable being an incident voltage at the target port; and a second sensing unit output signal proportional to a second electrical variable, the second electrical variable being a reflected voltage at the target port. Said incident voltage at the target port may be a complex incident voltage and said reflected voltage at the target port may be a complex reflected voltage.

The additional sensing unit (8) may for instance be such that the one or more additional sensing unit output signals comprise: a first additional sensing unit output signal proportional to a first electrical variable, the first electrical variable being a voltage across the user port; and a second additional sensing unit output signal proportional to a second electrical variable, the second electrical variable being a current flowing in the user port. Said voltage across the user port may be a complex voltage and said current flowing in the user port may be a complex current. Alternatively, the additional sensing unit (8) may for instance be such that the one or more additional sensing unit output signals comprise: a first additional sensing unit output signal proportional to a first electrical variable, the first electrical variable being an incident voltage at the user port; and a second additional sensing unit output signal proportional to a second electrical variable, the second electrical variable being a reflected voltage at the user port. Said incident voltage at the user port may be a complex incident voltage and said reflected voltage at the user port may be a complex reflected voltage.

Seventh Embodiment

Figure 9:
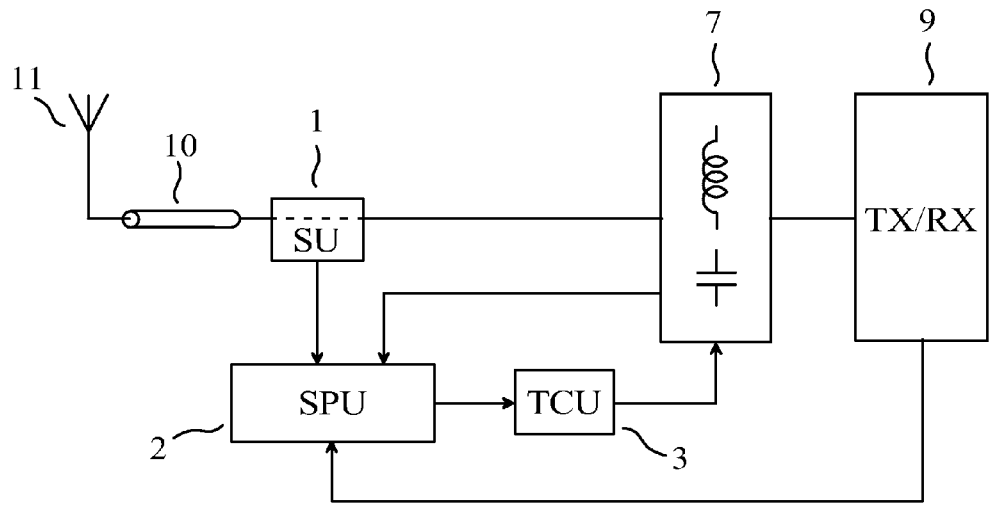
FIG. 9 shows the block diagram of a transceiver for radio communication comprising an automatic tuning system (seventh embodiment)

As a seventh embodiment of a device of the invention, given by way of non-limiting example, we have represented in FIG. 9 the block diagram of a transceiver for radio communication using an automatic tuning system of the invention. The transceiver shown in FIG. 9 is a transceiver for radio communication in a given frequency band, comprising:

an antenna (11), the antenna operating in the given frequency band;

a feeder (10), the feeder having a far end and a near end, the antenna being coupled to the far end of the feeder, the near end of the feeder presenting, at a frequency in the given frequency band, an impedance referred to as "the impedance presented by the near end of the feeder";

a radio device (9) which consists of all parts of the transceiver which are not shown elsewhere in FIG. 9, the radio device having a radio port, the radio device delivering "tuning sequence instructions" which indicate when a tuning sequence is being performed, an excitation being delivered by the radio port during said tuning sequence;

a sensing unit (1), the sensing unit delivering two "sensing unit output signals", each of the sensing unit output signals being mainly determined by one electrical variable sensed at the near end of the feeder;

a single-input-port and single-output-port tunable matching circuit (7), the single-input-port and single-output-port tunable matching circuit comprising an output port which is indirectly coupled to the near end of the feeder (10) through the sensing unit (1), the single-input-port and single-output-port tunable matching circuit comprising an input port which is directly coupled to the radio port of the radio device (9), the single-input-port and single-output-port tunable matching circuit comprising one or more adjustable impedance devices, the one or more adjustable impedance devices being referred to as "the adjustable impedance devices of the tunable matching circuit" and being such that, at said frequency in the given frequency band, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being mainly determined by one or more of the temperatures at said one or more locations;

a signal processing unit (2), the signal processing unit estimating two or more real quantities depending on the impedance presented by the near end of the feeder, using the tuning sequence instructions and using the sensing unit output signals obtained while the excitation was being delivered by the radio port during a tuning sequence, the signal processing unit delivering a "tuning instruction" as a function of said one or more temperature signals and as a function of said two or more real quantities depending on the impedance presented by the near end of the feeder; and a tuning control unit (3), the tuning control unit receiving the tuning instruction from the signal processing unit (2), the tuning control unit delivering one or more "tuning control signals" to the single-input-port and single-output-port tunable matching circuit, said one or more tuning control signals being determined as a function of the tuning instruction, the reactance of each of the adjustable impedance devices of the tunable matching circuit being mainly determined by at least one of the one or more tuning control signals.

The specialist understands that said "impedance presented by the near end of the feeder" of this seventh embodiment corresponds to said "impedance seen by the target port" of the first and second embodiments, evaluated at said frequency in the given frequency band.

The specialist understands that any small variation in the impedance of the antenna, caused by a change in operating frequency or a change in the medium surrounding the antenna, for instance due to the user interaction, can be compensated with an automatic adjustment of the adjustable impedance devices of the tunable matching circuit. Thus, it is always possible to obtain the best performance using the transceiver.

In order to respond to variations in the impedance of the antenna and/or in the temperatures at said one or more locations and/or in the operating frequency, the tuning instruction may be generated repeatedly. For instance, a new tuning sequence ending with the delivery of a new tuning instruction may start periodically, for instance every 10 milliseconds.

The transceiver is used for wireless transmission in a cellular network. The excitation is a bandpass signal, as in the second embodiment. The excitation is compatible with the requirements of standards typically applicable to cellular networks.

Eighth Embodiment

Figure 10:
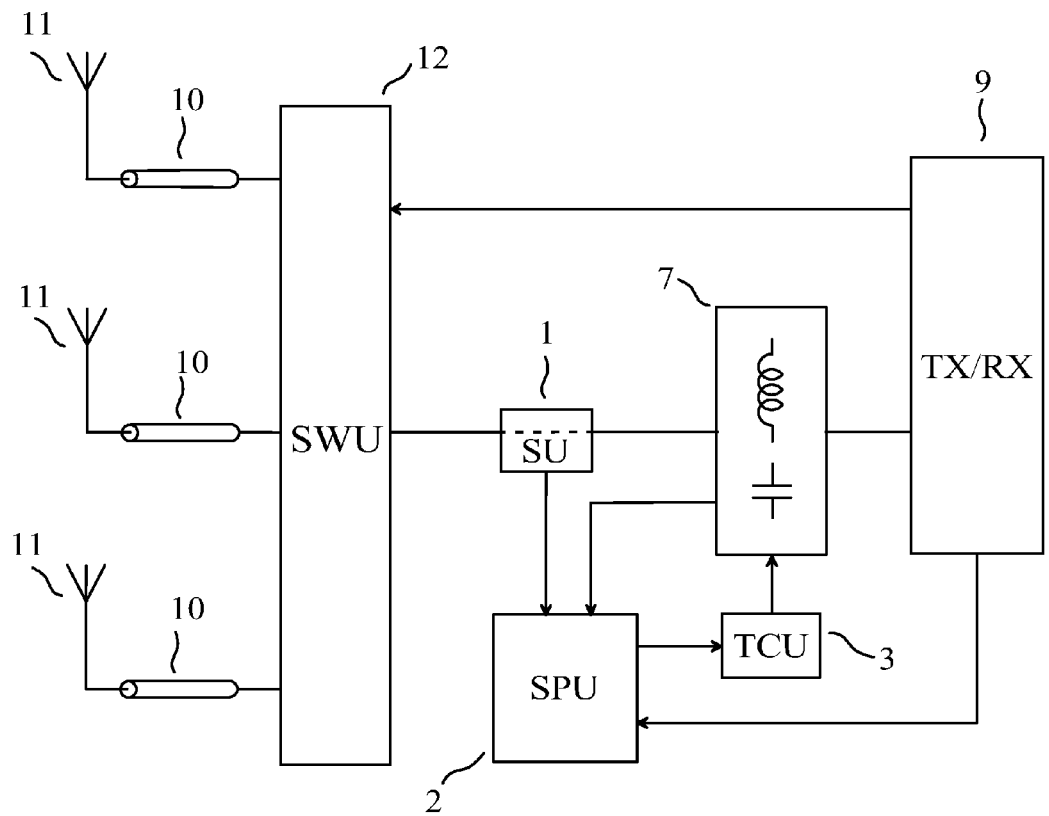
FIG. 10 shows the block diagram of a transceiver for radio communication comprising an automatic tuning system (eighth embodiment).

As an eighth embodiment of a device of the invention, given by way of non-limiting example, we have represented in FIG. 10 the block diagram of a transceiver for radio communication using an automatic tuning system of the invention. The transceiver shown in FIG. 10 is a transceiver for radio communication in a given frequency band, comprising:

N=3 antennas (11), each of the N antennas being such that it can operate at any frequency in the given frequency band;

a radio device (9) which consists of all parts of the transceiver which are not shown elsewhere in FIG. 10, the radio device having a radio port, the radio device delivering "tuning sequence instructions" which indicate when a tuning sequence is being performed, an excitation being delivered by the radio port during said tuning sequence;

a switching unit (12), the switching unit receiving a "configuration instruction" generated automatically by the radio device, the switching unit comprising N "antenna ports" each coupled to one and only one of the antennas through a feeder (10), the switching unit comprising an "array port", the switching unit operating in an active configuration determined by the configuration instruction, the active configuration being one of a plurality of allowed configurations, the switching unit providing, in any one of the allowed configurations, for signals in the given frequency band, a bidirectional path between the array port and one and only one of the antenna ports, the array port presenting, at a frequency in the given frequency band, an impedance referred to as "the impedance presented by the array port";

a sensing unit (1), the sensing unit delivering two "sensing unit output signals", each of the sensing unit output signals being mainly determined by one electrical variable sensed at the array port;

a single-input-port and single-output-port tunable matching circuit (7), the single-input-port and single-output-port tunable matching circuit comprising an output port which is indirectly coupled to the array port through the sensing unit (1), the single-input-port and single-output-port tunable matching circuit comprising an input port which is directly coupled to the radio port of the radio device (9), the single-input-port and single-output-port tunable matching circuit comprising one or more adjustable impedance devices, the one or more adjustable impedance devices being referred to as "the adjustable impedance devices of the tunable matching circuit" and being such that, at said frequency in the given frequency band, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more "temperature signals", each of the one or more temperature signals being mainly determined by one or more of the temperatures at said one or more locations;

a signal processing unit (2), the signal processing unit estimating two or more real quantities depending on the impedance presented by the array port, using the tuning sequence instructions and using the sensing unit output signals obtained while the excitation was being delivered by the radio port during a tuning sequence, the signal processing unit delivering a "tuning instruction" as a function of said one or more temperature signals and as a function of said two or more real quantities depending on the impedance presented by the array port; and a tuning control unit (3), the tuning control unit receiving the tuning instruction from the signal processing unit (2), the tuning control unit delivering one or more "tuning control signals" to the single-input-port and single-output-port tunable matching circuit, said one or more tuning control signals being determined as a function of the tuning instruction, the reactance of each of the adjustable impedance devices of the tunable matching circuit being mainly determined by at least one of the one or more tuning control signals.

The specialist understands that said "impedance presented by the array port" of this eighth embodiment corresponds to said "impedance seen by the target port" of the first and second embodiments, evaluated at said frequency in the given frequency band.

The switching unit operates (or is used) in an active configuration determined by the configuration instruction, the active configuration being an allowed configuration among a plurality of allowed configurations, the switching unit providing, in any one of the allowed configurations, for signals in the given frequency band, a path between the array port and one of the antenna ports. Thus, the switching unit operates in an active configuration which is one of the allowed configurations, and each allowed configuration corresponds to a selection of one antenna port among the N antenna ports.

The switching unit provides, for signals in the given frequency band, a path between the array port and the selected antenna port. This path may preferably be a low loss path for signals in the given frequency band. The specialist understands that a suitable switching unit may comprise one or more electrically controlled switches and/or change-over switches (here, "electrically controlled" means "controlled by electrical means"). In this case, one or more of said electrically controlled switches and/or change-over switches may for instance be an electro-mechanical relay, or a micro-electromechanical switch (MEMS switch), or a circuit using one or more PIN diodes and/or one or more insulated-gate field-effect transistors (MOSFETs) as switching devices.

For instance, the configuration instruction may be determined as a function of one or more of the following variables:
- said two or more real quantities depending on the impedance presented by the array port;
- one or more localization variables, each of the localization variables depending, in a given use configuration, on the distance between a part of a human body and a zone of the transceiver;
- the frequencies used for radio communication with the selected antenna;
- one or more additional variables, each of the additional variables lying in a set of additional variables, the elements of the set of additional variables comprising: communication type variables which indicate whether a radio communication session is a voice communication session, a data communication session or another type of communication session; a speakerphone mode activation indicator; a speaker activation indicator; variables obtained using one or more accelerometers; user identity variables which depend on the identity of the current user; reception quality variables; and emission quality variables.

For instance, at least one of the localization variables may be an output of a localization sensor responsive to a pressure exerted by a part of a human body. For instance, at least one of the localization variables may be an output of a proximity sensor. For instance, at least one of the localization variables may be determined by a change of state of an output of a touchscreen.

The elements of said set of additional variables may further comprise one or more variables which are different from the localization variables and which characterize the grip with which a user is holding the transceiver.

The configuration instruction may for instance be determined using a lookup table.

INDICATIONS ON INDUSTRIAL APPLICATIONS

The method of the invention is suitable for optimally and automatically adjusting a single-input-port and single-output-port tunable matching circuit, and the automatic tuning system of the invention can automatically and optimally adjust its single-input-port and single-output-port tunable matching circuit. The automatic tuning system of the invention may be a part of a radio receiver, or of a radio transmitter. In such applications, the target port of the automatic tuning system of the invention may be directly or indirectly coupled to an antenna, and the user port of the automatic tuning system of the invention may be coupled to a radio-frequency signal input port of the radio receiver, or to a radio-frequency signal output port of the radio transmitter.

The method and the automatic tuning system of the invention can optimally, quickly and automatically adjust the single-input-port and single-output-port tunable matching circuit, without very difficult computations. The invention is therefore particularly suitable for mobile radio transmitters and radio transceivers, for instance those used in portable radiotelephones or portable computers, which may be subject to fast variations in the electromagnetic characteristics of the medium surrounding the one or more antennas being used for radio communication.

The invention claimed is:

1. A method for automatically adjusting a single-input-port and single-output-port tunable matching circuit, the single-input-port and single-output-port tunable matching circuit being a part of an automatic tuning system having a user port and a target port, the automatic tuning system allowing, at a given frequency, a transfer of power from the user port to the target port, the single-input-port and single-output-port tunable matching circuit comprising one or more adjustable impedance devices, the one or more adjustable impedance devices being referred to as the adjustable impedance devices of the tunable matching circuit and being such that, at said given frequency, each of the adjustable impedance devices of the tunable matching circuit has a reactance, the reactance of any one of the adjustable impedance devices of the tunable matching circuit being adjustable by electrical means, the method comprising the steps of:
- applying an excitation to the user port;
- sensing electrical variables at the target port, to obtain two or more sensing unit output signals, each of the sensing unit output signals being mainly determined by one or more of the electrical variables sensed at the target port;
- measuring, at one or more locations in the single-input-port and single-output-port tunable matching circuit, a temperature, to obtain one or more temperature signals, each of the one or more temperature signals being mainly determined by one or more of the temperatures at said one or more locations;
- estimating two or more real quantities depending on an impedance seen by the target port, using the sensing unit output signals obtained while the excitation is applied, said two or more real quantities depending on an impedance seen by the target port being sufficient for being able to compute a real part and an imaginary part of the impedance seen by the target port;
- using said one or more temperature signals and said two or more real quantities depending on an impedance seen by the target port, to obtain one or more tuning control signals; and
- applying each of the one or more tuning control signals to one or more of the adjustable impedance devices of the tunable matching circuit, the reactance of each of the adjustable impedance devices of the tunable matching circuit being mainly determined by at least one of the one or more tuning control signals.

2. The method of claim 1, wherein the single-input-port and single-output-port tunable matching circuit has an input port which is coupled to the user port, and wherein the single-input-port and single-output-port tunable matching circuit has an output port which is coupled to the target port.

3. The method of claim 2, wherein the reactance of any one of the adjustable impedance devices of the tunable matching circuit has an influence on an impedance presented by the user port.

4. The method of claim 3, wherein the tuning control signals are such that the impedance presented by the user port, at a specified frequency, approximates a wanted impedance, in any normal thermal environment of the single-input-port and single-output-port tunable matching circuit.

5. An automatic tuning system having a user port and a target port, the automatic tuning system allowing, at a given frequency, a transfer of power from the user port to the target port, the automatic tuning system comprising:
- a sensing unit, the sensing unit delivering two or more sensing unit output signals, each of the sensing unit output signals being mainly determined by one or more electrical variables sensed at the target port;

a single-input-port and single-output-port tunable matching circuit, the single-input-port and single-output-port tunable matching circuit comprising one or more adjustable impedance devices, the one or more adjustable impedance devices being referred to as the adjustable impedance devices of the tunable matching circuit and being such that, at said given frequency, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more temperature signals, each of the one or more temperature signals being mainly determined by one or more of the temperatures at said one or more locations;

a signal processing unit, the signal processing unit estimating two or more real quantities depending on an impedance seen by the target port, using the sensing unit output signals obtained while an excitation is applied to the user port, said two or more real quantities depending on an impedance seen by the target port being sufficient for being able to compute a real part and an imaginary part of the impedance seen by the target port, the signal processing unit delivering a tuning instruction as a function of said one or more temperature signals and as a function of said two or more real quantities depending on an impedance seen by the target port; and a tuning control unit, the tuning control unit receiving the tuning instruction from the signal processing unit, the tuning control unit delivering one or more tuning control signals to the single-input-port and single-output-port tunable matching circuit, said one or more tuning control signals being determined as a function of the tuning instruction, the reactance of each of the adjustable impedance devices of the tunable matching circuit being mainly determined by at least one of the one or more tuning control signals.

6. The automatic tuning system of claim 5, wherein the single-input-port and single-output-port tunable matching circuit has an input port which is coupled to the user port, and wherein the single-input-port and single-output-port tunable matching circuit has an output port which is coupled to the target port.

7. The automatic tuning system of claim 6, wherein the reactance of any one of the adjustable impedance devices of the tunable matching circuit has an influence on an impedance presented by the user port.

8. The automatic tuning system of claim 7, wherein the tuning control signals are such that the impedance presented by the user port, at a specified frequency, approximates a wanted impedance, in any normal thermal environment of the single-input-port and single-output-port tunable matching circuit.

9. The automatic tuning system of claim 7, wherein the sensing unit output signals comprise: a first sensing unit output signal proportional to a first electrical variable, the first electrical variable being a voltage across the target port; and a second sensing unit output signal proportional to a second electrical variable, the second electrical variable being a current flowing out of the target port.

10. The automatic tuning system of claim 7, wherein the sensing unit output signals comprise: a first sensing unit output signal proportional to a first electrical variable, the first electrical variable being an incident voltage at the target port; and a second sensing unit output signal proportional to a second electrical variable, the second electrical variable being a reflected voltage at the target port.

11. The automatic tuning system of claim 7, wherein the single-input-port and single-output-port tunable matching circuit comprises an electromagnetic screen.

12. An automatic tuning system having one user port and one target port, the automatic tuning system allowing, at a given frequency, a transfer of power from the user port to the target port, the automatic tuning system comprising:

a sensing unit, the sensing unit delivering two or more sensing unit output signals, each of the sensing unit output signals being mainly determined by one or more electrical variables sensed at the target port;

a single-input-port and single-output-port tunable matching circuit, the single-input-port and single-output-port tunable matching circuit comprising one or more adjustable impedance devices, the one or more adjustable impedance devices being referred to as the adjustable impedance devices of the tunable matching circuit and being such that, at said given frequency, each of the adjustable impedance devices of the tunable matching circuit has a reactance, the reactance of any one of the adjustable impedance devices of the tunable matching circuit being adjustable by electrical means, the single-input-port and single-output-port tunable matching circuit comprising a temperature measurement device which measures, at one or more locations in the single-input-port and single-output-port tunable matching circuit, a temperature, to obtain one or more temperature signals, each of the one or more temperature signals being mainly determined by one or more of the temperatures at said one or more locations;

a signal processing unit, the signal processing unit estimating two or more real quantities depending on an impedance seen by the target port, using the sensing unit output signals obtained while an excitation is applied to the user port, said two or more real quantities depending on an impedance seen by the target port being sufficient for being able to compute a real part and an imaginary part of the impedance seen by the target port, the signal processing unit delivering a tuning instruction as a function of said two or more real quantities depending on an impedance seen by the target port; and a tuning control unit, the tuning control unit receiving the tuning instruction from the signal processing unit, the tuning control unit delivering one or more tuning control signals to the single-input-port and single-output-port tunable matching circuit, said one or more tuning control signals being determined as a function of said one or more temperature signals and as a function of the tuning instruction, the reactance of each of the adjustable impedance devices of the tunable matching circuit being mainly determined by at least one of the one or more tuning control signals.

13. The automatic tuning system of claim 12, wherein the single-input-port and single-output-port tunable matching circuit has an input port which is coupled to the user port, and wherein the single-input-port and single-output-port tunable matching circuit has an output port which is coupled to the target port.

14. The automatic tuning system of claim 13, wherein the reactance of any one of the adjustable impedance devices of the tunable matching circuit has an influence on an impedance presented by the user port.

15. The automatic tuning system of claim 14, wherein the tuning control signals are such that the impedance presented by the user port, at a specified frequency, approximates a wanted impedance, in any normal thermal environment of the single-input-port and single-output-port tunable matching circuit.

16. The automatic tuning system of claim 14, wherein the sensing unit output signals comprise: a first sensing unit output signal proportional to a first electrical variable, the first electrical variable being a voltage across the target port; and a second sensing unit output signal proportional to a second electrical variable, the second electrical variable being a current flowing out of the target port.

17. The automatic tuning system of claim 14, wherein the sensing unit output signals comprise: a first sensing unit output signal proportional to a first electrical variable, the first electrical variable being an incident voltage at the target port; and a second sensing unit output signal proportional to a second electrical variable, the second electrical variable being a reflected voltage at the target port.

18. The automatic tuning system of claim 14, wherein the single-input-port and single-output-port tunable matching circuit comprises an electromagnetic screen.

19. The automatic tuning system of claim 14, wherein the tuning instruction is delivered as a function of said one or more temperature signals and as a function of said two or more real quantities depending on an impedance seen by the target port.

* * * * *